(12) United States Patent
Zhao et al.

(10) Patent No.: US 11,930,191 B2
(45) Date of Patent: Mar. 12, 2024

(54) LUMA MAPPING—AND CHROMA SCALING-BASED VIDEO OR IMAGE CODING

(71) Applicant: LG ELECTRONICS INC., Seoul (KR)

(72) Inventors: Jie Zhao, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 185 days.

(21) Appl. No.: 17/608,096

(22) PCT Filed: May 12, 2020

(86) PCT No.: PCT/KR2020/006205
§ 371 (c)(1),
(2) Date: Nov. 1, 2021

(87) PCT Pub. No.: WO2020/231139
PCT Pub. Date: Nov. 19, 2020

(65) Prior Publication Data
US 2022/0329828 A1    Oct. 13, 2022

Related U.S. Application Data

(60) Provisional application No. 62/848,606, filed on May 16, 2019.

(51) Int. Cl.
*H04N 19/186* (2014.01)
*H04N 19/132* (2014.01)
*H04N 19/169* (2014.01)

(52) U.S. Cl.
CPC ......... *H04N 19/186* (2014.11); *H04N 19/132* (2014.11); *H04N 19/188* (2014.11)

(58) Field of Classification Search
CPC ... H04N 19/186; H04N 19/132; H04N 19/188
See application file for complete search history.

(56) References Cited

U.S. PATENT DOCUMENTS

2016/0014420 A1\* 1/2016 Su ......................... H04N 19/30
375/240.08

FOREIGN PATENT DOCUMENTS

| KR | 101641523 B1 | 7/2016 |
| KR | 20180054782 A | 5/2018 |
| WO | 2019006300 A1 | 1/2019 |

OTHER PUBLICATIONS

Taoran Lu, et al., "CE12: Mapping functions (test CE12-1 and CE12-2)", Joint Video Experts Team (JVET) of ITU-T SG 16 WP 3 and ISO/IEC JTC 1/SC 29/WG 11, 13th Meeting: Marrakech, MA, Jan. 9-18, 2019. JVET-M0427.

(Continued)

*Primary Examiner* — On S Mung
(74) *Attorney, Agent, or Firm* — Bryan Cave Leighton Paisner LLP

(57) ABSTRACT

According to the disclosure of the present document, for LMCS, a linear reshaper may be used, LMCS codewords (or ranges thereof) may be restricted, and in the chroma scaling of the LMCS, a single chroma residual scaling factor may be used. Accordingly, the resources/cost (of software or hardware) necessary for an LMCS procedure may be minimized, and latency in coding may be eliminated, thus enabling the LMCS procedure to be efficiently performed.

14 Claims, 16 Drawing Sheets

(56) References Cited

OTHER PUBLICATIONS

Edouard François, et al., "CE12-related: in-loop luma reshaping with approximate inverse mapping function", Joint Video Experts Team (JVET) of ITU-T SG 16 WP 3 and ISO/IEC JTC 1/SC 29/WG 11. Jan. 11, 2019. JVET-M0640.

* cited by examiner

LUMA MAPPING—AND CHROMA SCALING-BASED VIDEO OR IMAGE CODING

This application is a National Stage Application of International Application No. PCT/KR2020/006205, filed May 12, 2020, and claims the benefit of U.S. Provisional Application No. 62/848,606, filed May 16, 2019, all of which are hereby incorporated by reference in their entirety for all purposes as if fully set forth herein.

BACKGROUND OF THE DISCLOSURE

Field of the Disclosure

The present document relates to luma mapping and chroma scaling based video or image coding.

Related Art

Recently, demand for high-resolution, high-quality image/video such as 4K or 8K or higher ultra high definition (UHD) image/video has increased in various fields. As image/video data has high resolution and high quality, the amount of information or bits to be transmitted increases relative to the existing image/video data, and thus, transmitting image data using a medium such as an existing wired/wireless broadband line or an existing storage medium or storing image/video data using existing storage medium increase transmission cost and storage cost.

In addition, interest and demand for immersive media such as virtual reality (VR) and artificial reality (AR) content or holograms has recently increased and broadcasting for image/video is having characteristics different from reality images such as game images has increased.

Accordingly, a highly efficient image/video compression technology is required to effectively compress, transmit, store, and reproduce information of a high-resolution, high-quality image/video having various characteristics as described above.

In addition, there is a discussion about techniques using luma mapping with chroma scaling (LMCS) to improve compression efficiency and increase subjective/objective visual quality. In order to efficiently apply these techniques, there is a need for a method for efficiently signaling related information.

SUMMARY

According to an embodiment of the present document, a method and an apparatus for increasing image coding efficiency are provided.

According to an embodiment of the present document, efficient filtering application method and apparatus are provided.

According to an embodiment of the present document, efficient LMCS application method and apparatus are provided.

According to an embodiment of the present document, the LMCS codewords (or a range thereof) may be constrained.

According to an embodiment of the present document, a single chroma residual scaling factor may be used in chroma scaling in LMCS.

According to an embodiment of the present document, a linear reshaper may be used for LMCS.

According to an embodiment of the present document, a video/image decoding method performed by a decoding apparatus is provided.

According to an embodiment of the present document, a decoding apparatus for performing video/image decoding is provided.

According to an embodiment of the present document, a video/image encoding method performed by an encoding apparatus is provided.

According to an embodiment of the present document, an encoding apparatus for performing video/image encoding is provided.

According to one embodiment of the present document, there is provided a computer-readable digital storage medium in which encoded video/image information, generated according to the video/image encoding method disclosed in at least one of the embodiments of the present document, is stored.

According to an embodiment of the present document, there is provided a computer-readable digital storage medium in which encoded information or encoded video/image information, causing to perform the video/image decoding method disclosed in at least one of the embodiments of the present document by the decoding apparatus, is stored.

Advantageous Effects

According to an embodiment of the present document, overall image/video compression efficiency may be improved.

According to an embodiment of the present document, subjective/objective visual quality may be improved through efficient filtering.

According to an embodiment of the present document, the LMCS process for image/video coding may be efficiently performed.

According to an embodiment of the present document, it is possible to minimize resources/costs (of software or hardware) required for the LMCS process.

According to an embodiment of the present document, hardware implementation for the LMCS process may be facilitated.

According to an embodiment of the present document, a division operation required for derivation of LMCS codewords in mapping (reshaping) can be removed or minimized by constraint of the LMCS codewords (or range thereof).

According to an embodiment of the present document, latency according to piecewise index identification may be removed by using a single chroma residual scaling factor.

According to an embodiment of the present document, a chroma residual scaling process can be performed without depending on (reconstruction of) a luma block by using the linear reshaper, and thus latency in scaling can be removed.

DESCRIPTION OF EXEMPLARY EMBODIMENTS

Figure 1:
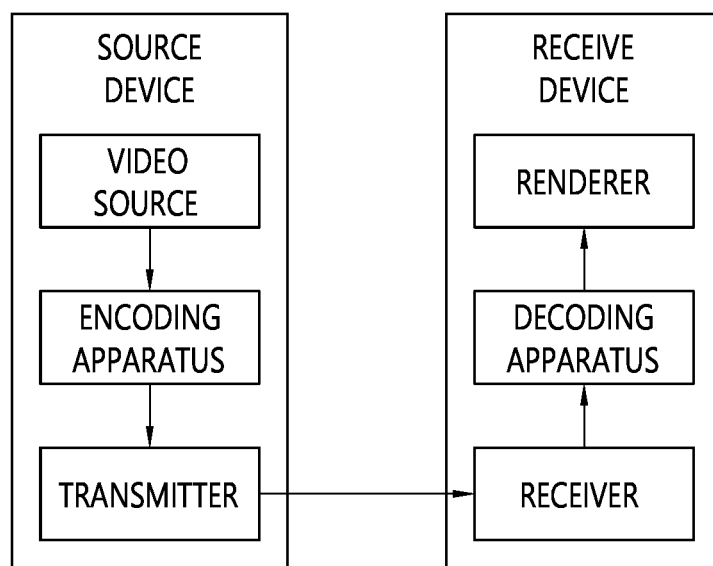
FIG. 1 illustrates an example of a video/image coding system to which the embodiments of the present document may be applied.

The present document may be modified in various forms, and specific embodiments thereof will be described and shown in the drawings. However, the embodiments are not intended for limiting the present document. The terms used in the following description are used to merely describe specific embodiments, but are not intended to limit the present document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each configuration in the drawings described in the present document is shown independently for the convenience of description regarding different characteristic functions, and does not mean that each configuration is implemented as separate hardware or separate software. For example, two or more components among each component may be combined to form one component, or one component may be divided into a plurality of components. Embodiments in which each component is integrated and/or separated are also included in the scope of the disclosure of the present document.

Hereinafter, examples of the present embodiment will be described in detail with reference to the accompanying drawings. In addition, like reference numerals are used to indicate like elements throughout the drawings, and the same descriptions on the like elements will be omitted.

FIG. 1 illustrates an example of a video/image coding system to which the embodiments of the present document may be applied.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present document relates to video/image coding. For example, a method/embodiment disclosed in the present document may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

The present document suggests various embodiments of video/image coding, and the above embodiments may also be performed in combination with each other unless otherwise specified.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into a multiple bricks, each of which may be constructed with one or more CTU rows within the tile. A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. In the present document, a tile group and a slice may be used in place of each other. For example, in the present document, a tile group/tile group header may be referred to as a slice/slice header.

Meanwhile, one picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

In the present document, "A or B" may mean "only A", "only B" or "both A and B". In other words, "A or B" in the present document may be interpreted as "A and/or B". For example, in the present document "A, B or C (A, B or C)" means "only A", "only B", "only C", or "any combination of A, B and C".

A slash (/) or comma (comma) used in the present document may mean "and/or". For example, "A/B" may mean "A and/or B". Accordingly, "A/B" may mean "only A", "only B", or "both A and B". For example, "A, B, C" may mean "A, B, or C".

In the present document, "at least one of A and B" may mean "only A", "only B" or "both A and B". Also, in the present document, the expression "at least one of A or B" or "at least one of A and/or B" may be interpreted the same as "at least one of A and B".

Also, in the present document, "at least one of A, B and C" means "only A", "only B", "only C", or "any combination of A, B and C". Also, "at least one of A, B or C" or "at least one of A, B and/or C" may mean "at least one of A, B and C".

Also, parentheses used in the present document may mean "for example". Specifically, when "prediction (intra prediction)" is indicated, "intra prediction" may be proposed as an example of "prediction". In other words, "prediction" in the present document is not limited to "intra prediction", and "intra prediction" may be proposed as an example of "prediction". Also, even when "prediction (i.e., intra prediction)" is indicated, "intra prediction" may be proposed as an example of "prediction".

Technical features that are individually described in one drawing in the present document may be implemented individually or simultaneously.

Figure 2:
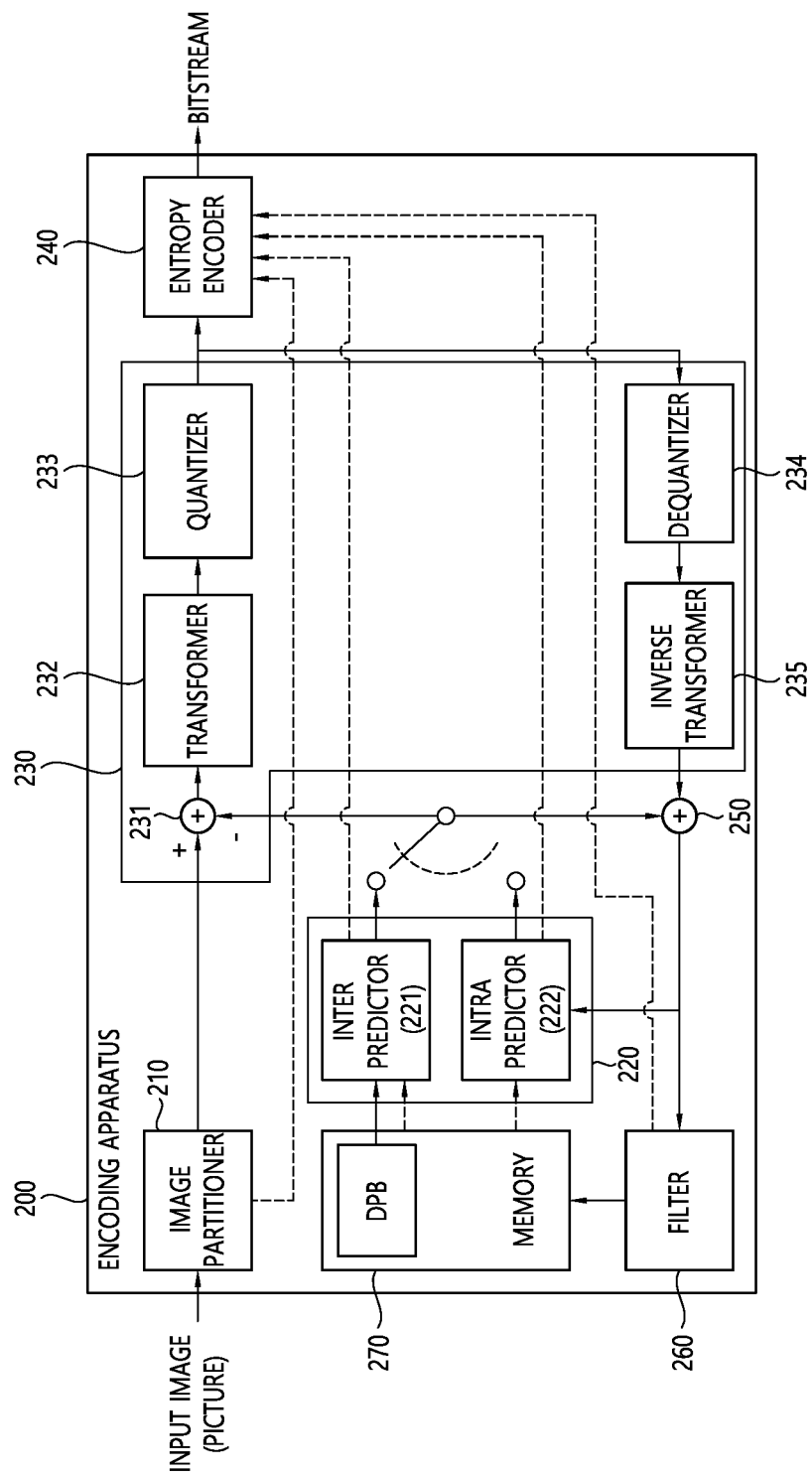
FIG. 2 is a diagram schematically illustrating a configuration of a video/image encoding apparatus to which the embodiments of the present document may be applied.

FIG. 2 is a diagram schematically illustrating a configuration of a video/image encoding apparatus to which the embodiments of the present document may be applied. Hereinafter, what is referred to as the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
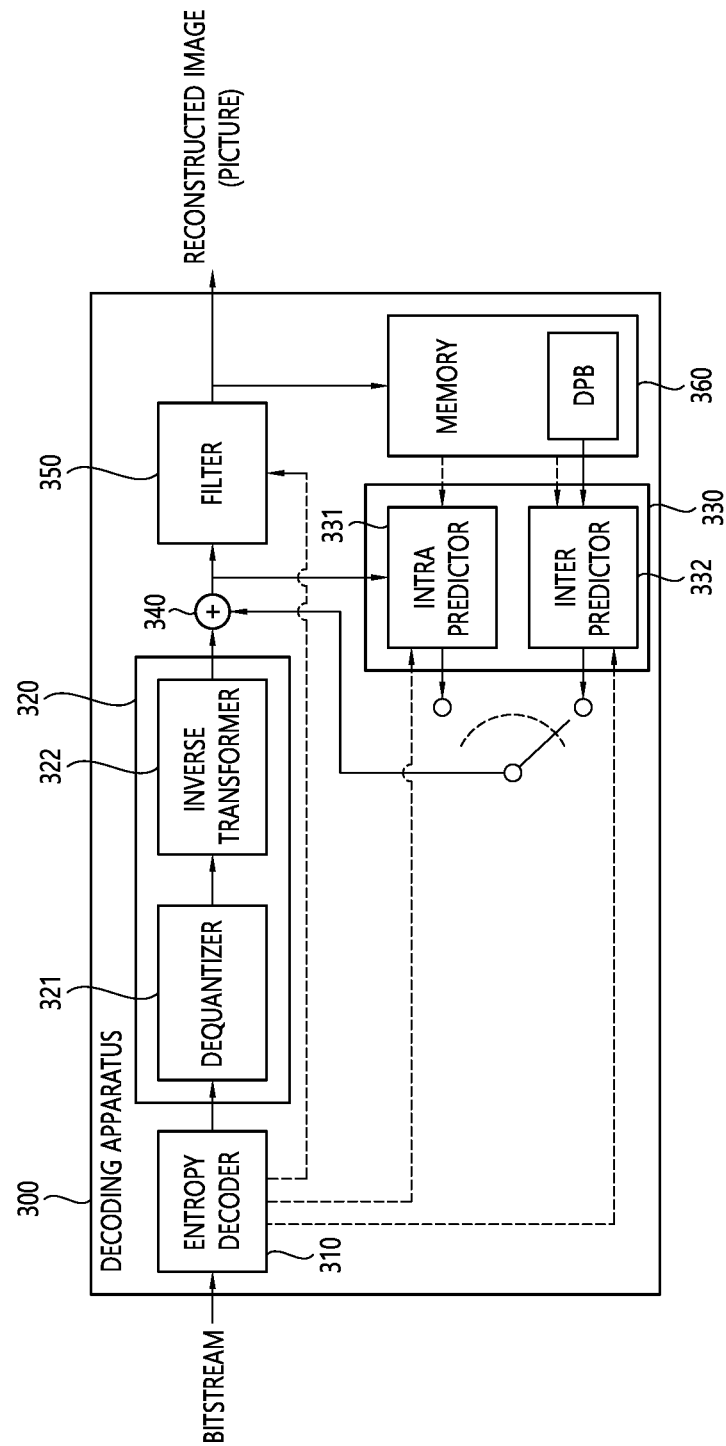
FIG. 3 is a diagram schematically illustrating a configuration of a video/image decoding apparatus to which the embodiments of the present document may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex.

video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present document, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in video coding, prediction is performed to increase compression efficiency. Through this, it is possible to generate a predicted block including prediction samples for a current block, which is a block to be coded. Here, the predicted block includes prediction samples in a spatial domain (or pixel domain) The predicted block is derived equally from the encoding device and the decoding device, and the encoding device decodes information (residual information) on the residual between the original block and the predicted block, not the original sample value of the original block itself. By signaling to the device, image coding efficiency can be increased. The decoding apparatus may derive a residual block including residual samples based on the residual information, and generate a reconstructed block including reconstructed samples by summing the residual block and the predicted block, and generate a reconstructed picture including reconstructed blocks.

The residual information may be generated through transformation and quantization processes. For example, the encoding apparatus may derive a residual block between the original block and the predicted block, and perform a transform process on residual samples (residual sample array) included in the residual block to derive transform coefficients, and then, by performing a quantization process on the transform coefficients, derive quantized transform coefficients to signal the residual related information to the decoding apparatus (via a bitstream). Here, the residual information may include location information, a transform technique, a transform kernel, and a quantization parameter, value information of the quantized transform coefficients etc. The decoding apparatus may perform dequantization/inverse transformation process based on the residual information and derive residual samples (or residual blocks). The decoding apparatus may generate a reconstructed picture based on the predicted block and the residual block. The encoding apparatus may also dequantize/inverse transform the quantized transform coefficients for reference for inter prediction of a later picture to derive a residual block, and generate a reconstructed picture based thereon.

In the present document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficients may be called coefficients or residual coefficients, or may still be called transform coefficients for uniformity of expression.

In the present document, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on an inverse transform (transform) of the scaled transform coefficients. This may be applied/expressed in other parts of the present document as well.

Intra prediction may refer to prediction that generates prediction samples for the current block based on reference samples in a picture to which the current block belongs (hereinafter, referred to as a current picture). When intra prediction is applied to the current block, neighboring reference samples to be used for intra prediction of the current block may be derived. The neighboring reference samples of the current block may include samples adjacent to the left boundary of the current block having a size of nW×nH and a total of 2×nH samples neighboring the bottom-left, samples adjacent to the top boundary of the current block and a total of 2×nW samples neighboring the top-right, and one sample neighboring the top-left of the current block. Alternatively, the neighboring reference samples of the current block may include a plurality of upper neighboring samples and a plurality of left neighboring samples. In addition, the neighboring reference samples of the current block may include a total of nH samples adjacent to the right boundary of the current block having a size of nW×nH, a total of nW samples adjacent to the bottom boundary of the current block, and one sample neighboring (bottom-right) neighboring bottom-right of the current block.

However, some of the neighboring reference samples of the current block may not be decoded yet or available. In this case, the decoder may configure the neighboring reference samples to use for prediction by substituting the samples that are not available with the available samples. Alternatively, neighboring reference samples to be used for prediction may be configured through interpolation of the available samples.

When the neighboring reference samples are derived, (i) the prediction sample may be derived based on the average or interpolation of neighboring reference samples of the current block, and (ii) the prediction sample may be derived based on the reference sample present in a specific (prediction) direction for the prediction sample among the periphery reference samples of the current block. The case of (i) may be called non-directional mode or non-angular mode and the case of (ii) may be called directional mode or angular mode.

Furthermore, the prediction sample may also be generated through interpolation between the second neighboring sample and the first neighboring sample located in a direction opposite to the prediction direction of the intra prediction mode of the current block based on the prediction sample of the current block among the neighboring reference samples. The above case may be referred to as linear interpolation intra prediction (LIP). In addition, chroma prediction samples may be generated based on luma samples using a linear model. This case may be called LM mode.

In addition, a temporary prediction sample of the current block may be derived based on filtered neighboring reference samples, and at least one reference sample derived according to the intra prediction mode among the existing neighboring reference samples, that is, unfiltered neighboring reference samples, and the temporary prediction sample may be weighted-summed to derive the prediction sample of the current block. The above case may be referred to as position dependent intra prediction (PDPC).

In addition, a reference sample line having the highest prediction accuracy among the neighboring multi-reference sample lines of the current block may be selected to derive the prediction sample by using the reference sample located in the prediction direction on the corresponding line, and then the reference sample line used herein may be indicated (signaled) to the decoding apparatus, thereby performing intra-prediction encoding. The above case may be referred to as multi-reference line (MRL) intra prediction or MRL based intra prediction.

In addition, intra prediction may be performed based on the same intra prediction mode by dividing the current block into vertical or horizontal subpartitions, and neighboring reference samples may be derived and used in the subpartition unit. That is, in this case, the intra prediction mode for the current block is equally applied to the subpartitions, and the intra prediction performance may be improved in some cases by deriving and using the neighboring reference samples in the subpartition unit. Such a prediction method may be called intra subpartitions (ISP) or ISP based intra prediction.

The above-described intra prediction methods may be called an intra prediction type separately from the intra prediction mode. The intra prediction type may be called in various terms such as an intra prediction technique or an additional intra prediction mode. For example, the intra prediction type (or additional intra prediction mode) may include at least one of the above-described LIP, PDPC, MRL, and ISP. A general intra prediction method except for the specific intra prediction type such as LIP, PDPC, MRL, or ISP may be called a normal intra prediction type. The normal intra prediction type may be generally applied when the specific intra prediction type is not applied, and prediction may be performed based on the intra prediction mode described above. Meanwhile, post-filtering may be performed on the predicted sample derived as needed.

Specifically, the intra prediction procedure may include an intra prediction mode/type determination step, a neighboring reference sample derivation step, and an intra prediction mode/type based prediction sample derivation step.

In addition, a post-filtering step may be performed on the predicted sample derived as needed.

When intra prediction is applied, the intra prediction mode applied to the current block may be determined using the intra prediction mode of the neighboring block. For example, the decoding apparatus may select one of most probable mode (mpm) candidates of an mpm list derived based on the intra prediction mode of the neighboring block (ex. left and/or upper neighboring blocks) of the current block based on the received mpm index and select one of the other remaining intro prediction modes not included in the mpm candidates (and planar mode) based on the remaining intra prediction mode information. The mpm list may be configured to include or not include a planar mode as a candidate. For example, if the mpm list includes the planar mode as a candidate, the mpm list may have six candidates. If the mpm list does not include the planar mode as a candidate, the mpm list may have three candidates. When the mpm list does not include the planar mode as a candidate, a not planar flag (ex. intra_luma_not_planar_flag) indicating whether an intra prediction mode of the current block is not the planar mode may be signaled. For example, the mpm flag may be signaled first, and the mpm index and not planar flag may be signaled when the value of the mpm flag is 1. In addition, the mpm index may be signaled when the value of the not planar flag is 1. Here, the mpm list is configured not to include the planar mode as a candidate does not is to signal the not planar flag first to check whether it is the planar mode first because the planar mode is always considered as mpm.

For example, whether the intra prediction mode applied to the current block is in mpm candidates (and planar mode) or in remaining mode may be indicated based on the mpm flag (ex. Intra_luma_mpm_flag). A value 1 of the mpm flag may indicate that the intra prediction mode for the current block is within mpm candidates (and planar mode), and a value 0 of the mpm flag may indicate that the intra prediction mode for the current block is not in the mpm candidates (and planar mode). The value 0 of the not planar flag (ex. Intra_luma_not_planar_flag) may indicate that the intra prediction mode for the current block is planar mode, and the value 1 of the not planar flag value may indicate that the intra prediction mode for the current block is not the planar mode. The mpm index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may index remaining intra prediction modes not included in the mpm candidates (and planar mode) among all intra prediction modes in order of prediction mode number to indicate one of them. The intra prediction mode may be an intra prediction mode for a luma component (sample). Hereinafter, intra prediction mode information may include at least one of the mpm flag (ex. Intra_luma_mpm_flag), the not planar flag (ex. Intra_luma_not_planar_flag), the mpm index (ex. mpm_idx or intra_luma_mpm_idx), and the remaining intra prediction mode information (rem_intra_luma_pred_mode or intra_luma_mpm_remainder). In the present document, the MPM list may be referred to in various terms such as MPM candidate list and candModeList. When MIP is applied to the current block, a separate mpm flag (ex. intra_mip_mpm_flag), an mpm index (ex. intra_mip_mpm_idx), and remaining intra prediction mode information (ex. intra_mip_mpm_remainder) for MIP may be signaled and the not planar flag is not signaled.

In other words, in general, when block splitting is performed on an image, a current block and a neighboring block to be coded have similar image characteristics. Therefore, the current block and the neighboring block have a high probability of having the same or similar intra prediction mode. Thus, the encoder may use the intra prediction mode of the neighboring block to encode the intra prediction mode of the current block.

For example, the encoder/decoder may configure a list of most probable modes (MPM) for the current block. The MPM list may also be referred to as an MPM candidate list. Herein, the MPM may refer to a mode used to improve coding efficiency in consideration of similarity between the current block and neighboring block in intra prediction mode coding. As described above, the MPM list may be configured to include the planar mode or may be configured to exclude the planar mode. For example, when the MPM list includes the planar mode, the number of candidates in the MPM list may be 6. And, if the MPM list does not include the planar mode, the number of candidates in the MPM list may be 5.

The encoder/decoder may configure an MPM list including 5 or 6 MPMs.

In order to configure the MPM list, three types of modes can be considered: default intra modes, neighbor intra modes, and the derived intra modes.

For the neighboring intra modes, two neighboring blocks, i.e., a left neighboring block and an upper neighboring block, may be considered.

As described above, if the MPM list is configured not to include the planar mode, the planar mode is excluded from the list, and the number of MPM list candidates may be set to 5.

In addition, the non-directional mode (or non-angular mode) among the intra prediction modes may include a DC mode based on the average of neighboring reference samples of the current block or a planar mode based on interpolation.

When inter prediction is applied, the predictor of the encoding apparatus/decoding apparatus may derive a prediction sample by performing inter prediction in units of blocks. Inter prediction may be a prediction derived in a manner that is dependent on data elements (ex. sample values or motion information) of picture(s) other than the current picture. When inter prediction is applied to the current block, a predicted block (prediction sample array) for the current block may be derived based on a reference block (reference sample array) specified by a motion vector on the reference picture indicated by the reference picture index. Here, in order to reduce the amount of motion information transmitted in the inter prediction mode, the motion information of the current block may be predicted in units of blocks, subblocks, or samples based on correlation of motion information between the neighboring block and the current block. The motion information may include a motion vector and a reference picture index. The motion information may further include inter prediction type (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, a motion information candidate list may be configured based on neighboring blocks of the current block, and flag or index information indicating which candidate is selected (used) may be signaled to derive a motion vector and/or a reference picture index of the current block. Inter prediction may be performed based on various prediction modes. For example, in the case of a skip mode and a merge mode, the motion information of the current block may be the same as motion information of the neighboring block. In the skip mode, unlike the merge mode, the residual signal may not be transmitted. In the case of the motion vector prediction (MVP) mode, the motion vector of the selected neighboring block may be used as a motion vector predictor and the motion vector of the current block may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). The motion vector in the L0 direction may be referred to as an L0 motion vector or MVL0, and the motion vector in the L1 direction may be referred to as an L1 motion vector or MVL1. Prediction based on the L0 motion vector may be called L0 prediction, prediction based on the L1 motion vector may be called L1 prediction, and prediction based on both the L0 motion vector and the L1 motion vector may be called bi-prediction. Here, the L0 motion vector may indicate a motion vector associated with the reference picture list L0 (L0), and the L1 motion vector may indicate a motion vector associated with the reference picture list L1 (L1). The reference picture list L0 may include pictures that are earlier in output order than the current picture as reference pictures, and the reference picture list L1 may include pictures that are later in the output order than the current picture. The previous pictures may be called forward (reference) pictures, and the subsequent pictures may be called reverse (reference) pictures. The reference picture list L0 may further include pictures that are later in the output order than the current picture as reference pictures. In this case, the previous pictures may be indexed first in the reference picture list L0 and the subsequent pictures may be indexed later. The reference picture list L1 may further include previous pictures in the output order than the current picture as reference pictures. In this case, the subsequent pictures may be indexed first in the reference picture list 1 and the previous pictures may be indexed later. The output order may correspond to picture order count (POC) order.

Figure 4:
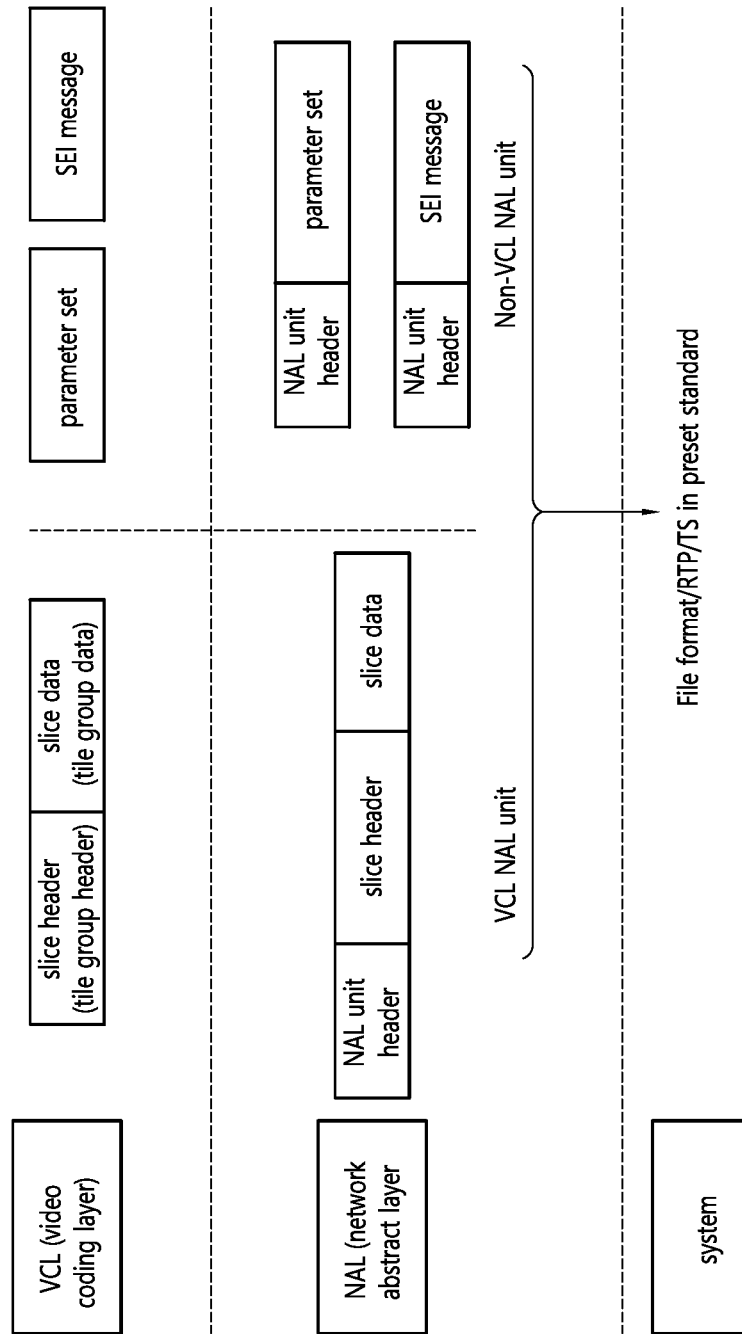
FIG. 4 exemplarily shows a hierarchical structure for a coded image/video.

FIG. 4 exemplarily shows a hierarchical structure for a coded image/video.

Referring to FIG. 4, coded image/video is divided into a video coding layer (VCL) that handles the decoding process of the image/video and itself, a subsystem that transmits and stores the coded information, and NAL (network abstraction layer) in charge of function and present between the VCL and the subsystem.

In the VCL, VCL data including compressed image data (slice data) is generated, or a parameter set including a picture parameter set (PSP), a sequence parameter set (SPS), and a video parameter set (VPS) or a supplemental enhancement information (SEI) message additionally required for an image decoding process may be generated.

In the NAL, a NAL unit may be generated by adding header information (NAL unit header) to a raw byte sequence payload (RBSP) generated in a VCL. In this case, the RBSP refers to slice data, parameter set, SEI message, etc., generated in the VCL. The NAL unit header may include NAL unit type information specified according to RBSP data included in the corresponding NAL unit.

As shown in the figure, the NAL unit may be classified into a VCL NAL unit and a Non-VCL NAL unit according to the RBSP generated in the VCL. The VCL NAL unit may mean a NAL unit that includes information on the image (slice data) on the image, and the Non-VCL NAL unit may mean a NAL unit that includes information (parameter set or SEI message) required for decoding the image.

The above-described VCL NAL unit and Non-VCL NAL unit may be transmitted through a network by attaching header information according to the data standard of the subsystem. For example, the NAL unit may be transformed into a data format of a predetermined standard such as an H.266/VVC file format, a real-time transport protocol (RTP), a transport stream (TS), etc., and transmitted through various networks.

As described above, the NAL unit may be specified with the NAL unit type according to the RBSP data structure included in the corresponding NAL unit, and information on the NAL unit type may be stored and signaled in the NAL unit header.

For example, the NAL unit may be classified into a VCL NAL unit type and a Non-VCL NAL unit type according to whether the NAL unit includes information (slice data) about an image. The VCL NAL unit type may be classified according to the nature and type of pictures included in the VCL NAL unit, and the Non-VCL NAL unit type may be classified according to types of parameter sets.

The following is an example of the NAL unit type specified according to the type of parameter set included in the Non-VCL NAL unit type.

- APS (Adaptation Parameter Set) NAL unit: Type for NAL unit including APS
- DPS (Decoding Parameter Set) NAL unit: Type for NAL unit including DPS
- VPS (Video Parameter Set) NAL unit: Type for NAL unit including VPS
- SPS (Sequence Parameter Set) NAL unit: Type for NAL unit including SPS
- PPS (Picture Parameter Set) NAL unit: Type for NAL unit including PPS
- PH (Picture header) NAL unit: Type for NAL unit including PH The aforementioned NAL unit types may have syntax information for the NAL unit type, and the syntax information may be stored and signaled in a NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. In the present document, a slice may be mixed or replaced with a tile group. Also, in the present document, a slice header may be mixed or replaced with a tile group header.

The slice header (slice header syntax) may include information/parameters that may be commonly applied to the slice. The APS (APS syntax) or the PPS (PPS syntax) may include information/parameters that may be commonly applied to one or more slices or pictures. The SPS (SPS syntax) may include information/parameters that may be commonly applied to one or more sequences. The VPS (VPS syntax) may include information/parameters that may be commonly applied to multiple layers. The DPS (DPS syntax) may include information/parameters that may be commonly applied to the overall video. The DPS may include information/parameters related to concatenation of a coded video sequence (CVS). The high level syntax (HLS) in the present document may include at least one of the APS syntax, the PPS syntax, the SPS syntax, the VPS syntax, the DPS syntax, and the slice header syntax.

In the present document, the image/image information encoded from the encoding apparatus and signaled to the decoding apparatus in the form of a bitstream includes not only partitioning related information in a picture, intra/inter prediction information, residual information, in-loop filtering information, etc, but also information included in a slice header, information included in the APS, information included in the PPS, information included in an SPS, and/or information included in the VPS.

Meanwhile, in order to compensate for a difference between an original image and a reconstructed image due to an error occurring in a compression coding process such as quantization, an in-loop filtering process may be performed on reconstructed samples or reconstructed pictures as described above. As described above, the in-loop filtering may be performed by the filter of the encoding apparatus and the filter of the decoding apparatus, and a deblocking filter, SAO, and/or adaptive loop filter (ALF) may be applied. For example, the ALF process may be performed after the deblocking filtering process and/or the SAO process are completed. However, even in this case, the deblocking filtering process and/or the SAO process may be omitted.

Meanwhile, in order to increase coding efficiency, luma mapping with chroma scaling (LMCS) may be applied as described above. LMCS may be referred to as a loop reshaper (reshaping). In order to increase coding efficiency, LMCS control and/or signaling of LMCS related information may be performed hierarchically.

Figure 5:
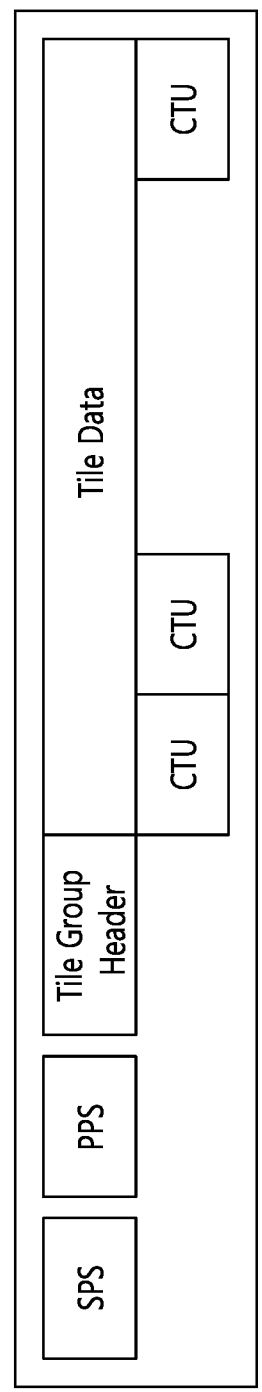
FIG. 5 exemplarily illustrates a hierarchical structure of a CVS according to an embodiment of the present document.

FIG. 5 exemplarily illustrates a hierarchical structure of a CVS according to an embodiment of the present document. A coded video sequence (CVS) may include a sequence parameter set (SPS), a picture parameter set (PPS), a tile group header, tile data, and/or CTU(s). Here, the tile group header and the tile data may be referred to as a slice header and slice data, respectively.

The SPS may include flags natively to enable tools to be used in CVS. In addition, the SPS may be referred to by the PPS including information on parameters that change for each picture. Each of the coded pictures may include one or more coded rectangular domain tiles. The tiles may be grouped into raster scans forming tile groups. Each tile group is encapsulated with header information called a tile group header. Each tile consists of a CTU comprising coded data. Here the data may include original sample values, prediction sample values, and its luma and chroma components (luma prediction sample values and chroma prediction sample values).

Figure 6:
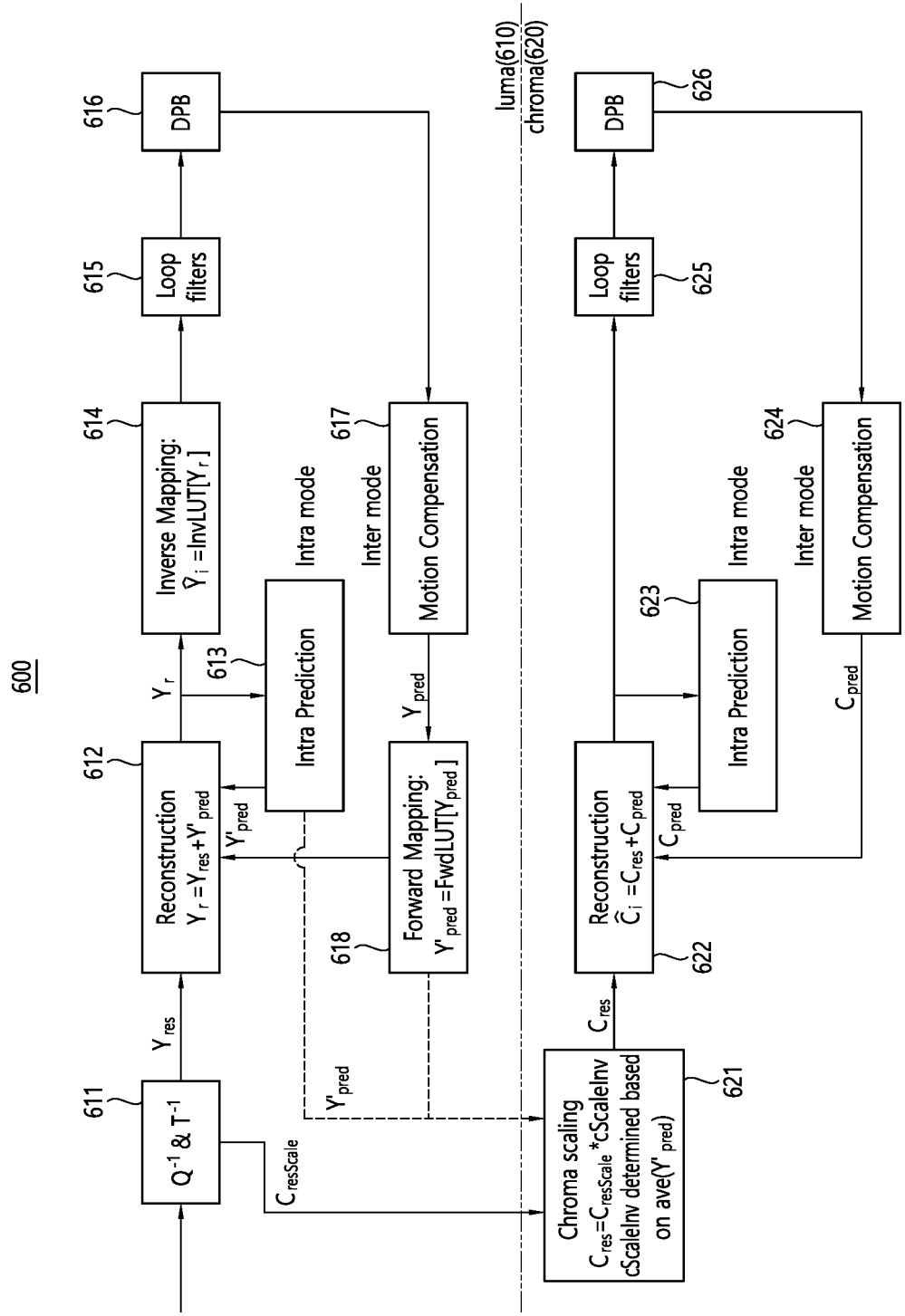
FIG. 6 illustrates an exemplary LMCS structure according to an embodiment of the present document.

FIG. 6 illustrates an exemplary LMCS structure according to an embodiment of the present document. The LMCS structure 600 of FIG. 6 includes an in-loop mapping part 610 of luma components based on adaptive piecewise linear (adaptive PWL) models and a luma-dependent chroma residual scaling part 620 for chroma components. The dequantization and inverse transform 611, reconstruction 612, and intra prediction 613 blocks of the in-loop mapping part 610 represent processes applied in the mapped (reshaped) domain. Loop filters 615, motion compensation or inter prediction 617 blocks of the in-loop mapping part 610, and reconstruction 622, intra prediction 623, motion compensation or inter prediction 624, loop filters 625 block of the chroma residual scaling part 620 represent processes applied in the original (non-mapped, non-reshaped) domain.

As illustrated in FIG. 6, when LMCS is enabled, at least one of the inverse mapping (reshaping) process 614, a forward mapping (reshaping) process 618, and a chroma scaling process 621 may be applied. For example, the inverse mapping process may be applied to a (reconstructed) luma sample (or luma samples or luma sample array) in a reconstructed picture. The inverse mapping process may be performed based on a piecewise function (inverse) index of a luma sample. The piecewise function (inverse) index may identify the piece to which the luma sample belongs. Output of the inverse mapping process is a modified (reconstructed) luma sample (or modified luma samples or modified luma sample array). The LMCS may be enabled or disabled at a level of a tile group (or slice), picture or higher.

The forward mapping process and/or the chroma scaling process may be applied to generate the reconstructed picture. A picture may comprise luma samples and chroma samples. A reconstructed picture with luma samples may be referred to as a reconstructed luma picture, and a reconstructed picture with chroma samples may be referred to as a reconstructed chroma picture. A combination of the reconstructed luma picture and the reconstructed chroma picture may be referred to as a reconstructed picture. The reconstructed luma picture may be generated based on the forward mapping process. For example, if an inter prediction is applied to a current block, a forward mapping is applied to a luma prediction sample derived based on a (reconstructed) luma sample in a reference picture. Because the (reconstructed) luma sample in the reference picture is generated based on the inverse mapping process, the forward mapping may be applied to the luma prediction sample thus a mapped (reshaped) luma prediction sample can be derived. The forward mapping process may be performed based on a piecewise function index of the luma prediction sample. The piecewise function index may be derived based on the value of the luma prediction sample or the value of the luma sample in the reference picture used for inter prediction. If an intra prediction (or an intra block copy (IBC)) is applied to the current block, the forward mapping is not necessary because the inverse mapping process has not applied to the reconstructed samples in the current picture yet. A (reconstructed) luma sample in the reconstructed luma picture is generated based on the mapped luma prediction sample and a corresponding luma residual sample.

The reconstructed chroma picture may be generated based on the chroma scaling process. For example, a (reconstructed) chroma sample in the reconstructed chroma picture may be derived based on a chroma prediction sample and a chroma residual sample ($c_{res}$) in a current block. The chroma residual sample ($c_{res}$) is derived based on a (scaled) chroma residual sample ($c_{resScale}$) and a chroma residual scaling factor (cScaleInv may be referred to as varScale) for the current block. The chroma residual scaling factor may be calculated based on reshaped luma prediction sample values for the current block. For example, the scaling factor may be calculated based on an average luma value ave($Y'_{pred}$) of the reshaped luma prediction sample values $Y'_{pred}$. For a reference, in FIG. 6, the (scaled) chroma residual sample derived based on the inverse transform/dequantization may be referred to as $c_{resScale}$, and the chroma residual sample derived by performing the (inverse) scaling process to the (scaled) chroma residual sample may be referred to as $c_{res}$.

Figure 7:
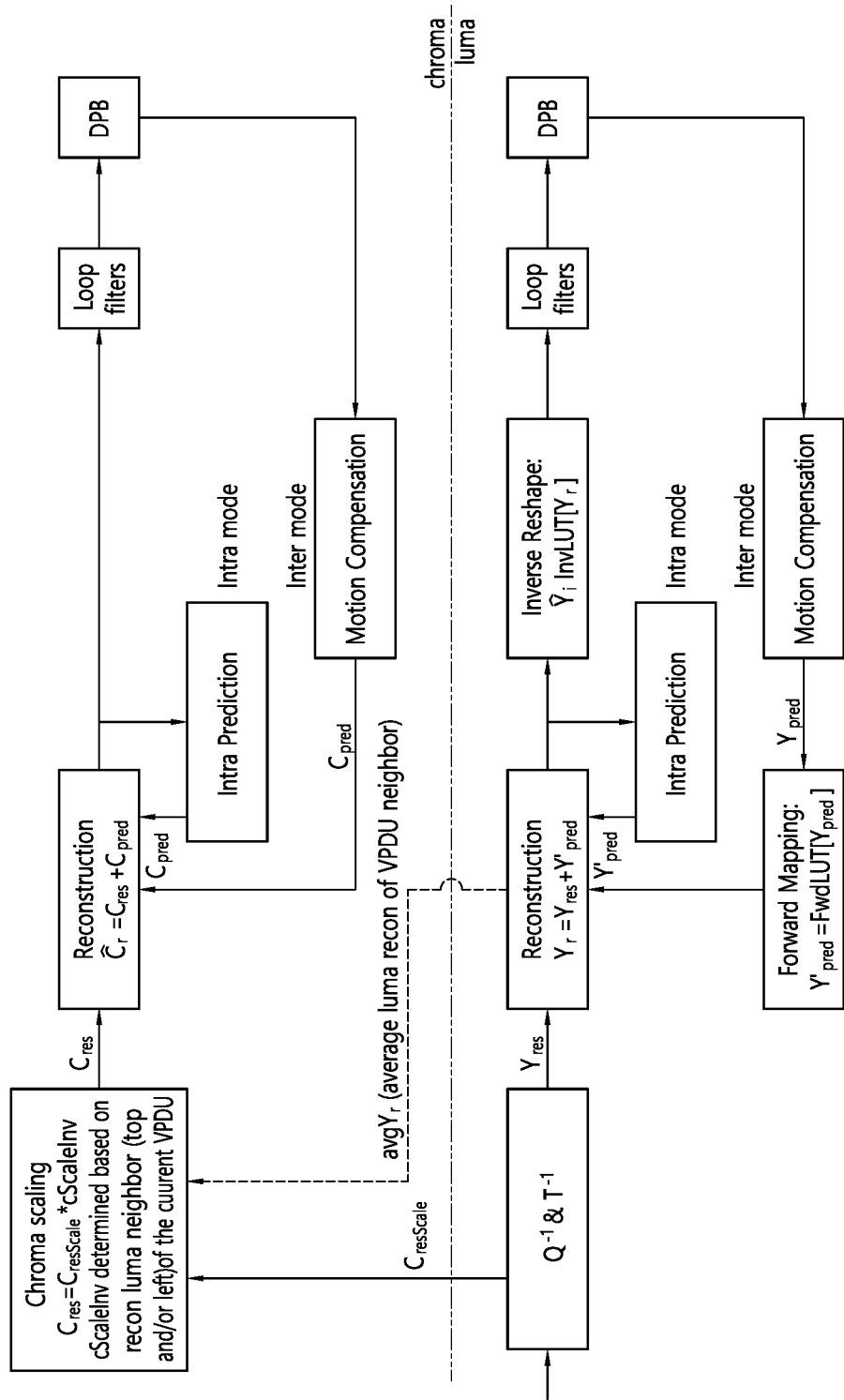
FIG. 7 illustrates an LMCS structure according to another embodiment of the present document.

FIG. 7 illustrates an LMCS structure according to another embodiment of the present document. FIG. 7 is described with reference to FIG. 6. Here, the difference between the LMCS structure of FIG. 7 and the LMCS structure 600 of FIG. 6 is mainly described. The in-loop mapping part and the luma-dependent chroma residual scaling part of FIG. 7 may operate the same as (similarly to) the in-loop mapping part 610 and the luma-dependent chroma residual scaling part 620 of FIG. 6.

Referring to FIG. 7, a chroma residual scaling factor may be derived based on luma reconstructed samples. In this case, an average luma value (avgYr) may be obtained (derived) based on the neighboring luma reconstructed samples outside the reconstructed block, not the inner luma reconstructed samples of the reconstructed block, and the chroma residual scaling factor is derived based on the average luma value (avgYr). Here, the neighboring luma reconstructed samples may be neighboring luma reconstructed samples of the current block, or may be neighboring luma reconstructed samples of virtual pipeline data units (VPDUs) including the current block. For example, when intra prediction is applied to the target block, reconstructed samples may be derived based on prediction samples which are derived based on the intra prediction. In the other example, when inter prediction is applied to the target block, the forward mapping is applied to prediction samples which are derived based on the inter prediction, and reconstructed samples are generated (derived) based on the reshaped (or forward mapped) luma prediction samples.

The video/image information signaled through the bitstream may include LMCS parameters (information on LMCS). LMCS parameters may be configured as high level syntax (HLS, including slice header syntax) or the like. Detailed description and configuration of the LMCS parameters will be described later. As described above, the syntax tables described in the present document (and the following embodiments) may be configured/encoded at the encoder end and signaled to the decoder end through a bitstream. The decoder may parse/decode information on the LMCS (in the form of syntax components) in the syntax tables. One or more embodiments to be described below may be combined. The encoder may encode the current picture based on the information about the LMCS and the decoder may decode the current picture based on the information about the LMCS.

The in-loop mapping of luma components may adjust the dynamic range of the input signal by redistributing the codewords across the dynamic range to improve compression efficiency. For luma mapping, a forward mapping (reshaping) function (FwdMap) and an inverse mapping (reshaping) function (InvMap) corresponding to the forward mapping function (FwdMap) may be used. The FwdMap function may be signaled using a piece-wise linear models, for example, the piece-wise linear model may have 16 pieces or bins. The pieces may have the equal length. In one example, the InvMap function does not need to be signalled and is instead derived from the FwdMap function. That is, the inverse mapping may be a function of the forward mapping. For example, the inverse mapping function may be mathematically built as the symmetric function of the forward mapping as reflected by the line y=x.

An in-loop (luma) reshaping may be used to map input luma values (samples) to altered values in the reshaped domain. The reshaped values may be coded and then mapped back into the original (un-mapped, un-reshaped) domain after reconstruction. To compensate for the interaction between the luma signal and the chroma signal, chroma residual scaling may be applied. In-loop reshaping is done by specifying high level syntax for the reshaper model. The reshaper model syntax may signal a piece-wise linear model (PWL model). For example, the reshaper model syntax may signal a PWL model with 16 bins or pieces of equal lengths. A forward lookup table (FwdLUT) and/or an inverse lookup table (InvLUT) may be derived based on the piece-wise linear model. For example, the PWL model pre-computes the 1024-entry forward (FwdLUT) and inverse (InvLUT) look up tables (LUT)s. As an example, when the forward lookup table FwdLUT is derived, the inverse lookup table InvLUT may be derived based on the forward lookup table FwdLUT. The forward lookup table FwdLUT may map the input luma values Yi to the altered values Yr, and the inverse lookup table InvLUT may map the altered values Yr to the reconstructed values Y'i. The reconstructed values Y'i may be derived based on the input luma values Yi.

In one example, the SPS may include the syntax of Table 1 below. The syntax of Table may include sps_reshaper_enabled_flag as a tool enabling flag. Here, sps_reshaper_enabled_flag may be used to specify whether the reshaper is used in a coded video sequence (CVS). That is, sps_reshaper_enabled_flag may be a flag for enabling reshaping in the SPS. In one example, the syntax of Table 1 may be a part of the SPS.

TABLE 1

| | Descriptor |
|---|---|
| seq_parameter_set_rbsp( ) { | |
|   sps_seq_parameter_set_id | ue(v) |
|   ... | |
|   sps_reshaper_enabled_flag | u(1) |
|   rbsp_trailing_bits( ) | |
| } | |

In one example, semantics on syntax elements sps_seq_parameter_set_id and sps_reshaper_enabled_flag may be as shown in Table 2 below.

TABLE 2 sps_seq_parameter_set_id provides an identifier for the SPS for reference by other syntax elements.
sps_reshaper_enabled_flag equal to 1 specifies that reshaper is used in the coded video sequence (CVS). sps_reshaper_enabled_flag equal to 0 specifies that reshaper is not used in the CVS.

In one example, the tile group header or the slice header may include the syntax of Table 3 or Table 4 below.

TABLE 3

| | Descriptor |
|---|---|
| tile_group_header( ) { | |
|   tile_group_pic_parameter_set_id | ue(v) |
|   ... | |
|   if( num_tiles_in_tile_group_minus1 > 0 ) { | |
|     offset_len_minus1 | ue(v) |
|     for( i = 0; i < num_tiles_in_tile_group_minus1; i++ ) | |
|       entry_point_offset_minus1[ i ] | u(v) |
|   } | |
|   if ( sps_reshaper_enabled_flag ) { | |
|     tile_group_reshaper_model_present_flag | u(1) |
|     if ( tile_group_reshaper_model_present_flag ) | |
|       tile_group_reshaper_model ( ) | |
|     tile_group_reshaper_enable_flag | u(1) |
|     if ( tile_group_reshaper_enable_flag && !( qtbtt_dual_tree_intra_flag && tile_group_type == I ) ) ) | |
|       tile_group_reshaper_chroma_residual_scale_flag | u(1) |
|   } | |
|   byte_alignment( ) | |
| } | |

TABLE 4

| | Descriptor |
|---|---|
| slice_header( ) { | |
|   slice_pic_parameter_set_id | ue(v) |
|   ... | |
|   if( num_tiles_in_slice_minus1 > 0 ) { | |
|     offset_len_minus1 | ue(v) |
|     for( i = 0; i < num_tiles_in_slice_minus1; i++ ) | |
|       entry_point_offset_minus1[ i ] | u(v) |
|   } | |
|   if ( sps_reshaper_enabled_flag ) { | |
|     slice_reshaper_model_present_flag | u(1) |
|     if ( slice_reshaper_model_present_flag ) | |
|       slice_reshaper_model ( ) | |
|     slice_reshaper_enable_flag | u(1) |
|     if( slice_reshaper_enable_flag && !( qtbtt_dual_tree_intra_flag && slice_type == I ) ) ) | |
|       slice_reshaper_chroma_residual_scale_flag | u(1) |
|   } | |
|   byte_alignment( ) | |
| } | |

Semantics of syntax elements included in the syntax of Table 3 or Table 4 may include, for example, matters disclosed in the following tables.

TABLE 5 tile_group_reshaper_model_present_flag equal to 1 specifies tile_group_reshaper_model ( ) is present in tile group header. tile_group_reshaper_model_present_flag equal to 0 specifies tile_group_reshaper_model( ) is not present in tile group header. When tile_group_reshaper_model_present_flag is not present, it is inferred to be equal to 0.
tile_group_reshaper_enabled_flag equal to 1 specifies that reshaper is enabled for the current tile group. tile_group_reshaper_enabled_flag equal to 0 specifies that reshaper is not enabled for the current tile group. When tile_group_reshaper_enable_flag is not present, it is inferred to be equal to 0.
tile_group_reshaper_chroma_residual_scale_flag equal to 1 specifies that chroma residual scaling is enabled for the current tile group. tile_group_reshaper_chroma_residual_scale_flag equal to 0 specifies that chroma residual scaling is not enabled for the current tile group. When tile_group_reshaper_chroma_residual_scale_flag is not present, it is inferred to be equal to 0.

TABLE 6 slice_reshaper_model_present_flag equal to 1 specifies slice_reshaper_model( ) is present
in slice header. slice_reshaper_model_present_flag equal to 0 specifies slice_reshaper_model( )
is not present in slice header. When slice_reshaper_model_present_flag is not
present, it is inferred to be equal to 0.
slice_reshaper_enabled_flag equal to 1 specifies that reshaper is enabled for the current
slice. slice_reshaper_enabled_flag equal to 0 specifies that reshaper is not enabled for
the current slice. When slice_reshaper_enable_flag is not present, it is inferred to be
equal to 0.
slice_reshaper_chroma_residual_scale_flag equal to 1 specifies that chroma residual
scaling is enabled for the current slice. slice_reshaper_chroma_residual_scale_flag equal to 0
specifies that chroma residual scaling is not enabled for the current slice. When
slice_reshaper_chroma_residual_scale_flag is not present, it is inferred to be equal to 0.

As one example, once the flag enabling the reshaping (i.e., sps_reshaper_enabled_flag) is parsed in the SPS, the tile group header may parse additional data (i.e., information included in Table 5 or 6 above) which is used to construct lookup tables (FwdLUT and/or InvLUT). In order to do this, the status of the SPS reshaper flag (sps_reshaper_enabled_flag) may be first checked in the slice header or the tile group header. When sps_reshaper_enabled_flag is true (or 1), an additional flag, i.e., tile_group_reshaper_model_present_flag (or slice_reshaper_model_present_flag) may be parsed. The purpose of the tile_group_reshaper_model_present_flag (or slice_reshaper_model_present_flag) may be to indicate the presence of the reshaping model. For example, when tile_group_reshaper_model_present_flag (or slice_reshaper_model_present_flag) is true (or 1), it may be indicated that the reshaper is present for the current tile group (or current slice). When tile_group_reshaper_model_present_flag (or slice_reshaper_model_present_flag) is false (or 0), it may be indicated that the reshaper is not present for the current tile group (or current slice).

If the reshaper is present and the reshaper is enabled in the current tile group (or current slice), the reshaper model (i.e., tile_group_reshaper_model( ) or slice_reshaper_model( ) may be processed. Further to this, an additional flag, tile_group_reshaper_enable_flag (or slice_reshaper_enable_flag) may also be parsed. The tile_group_reshaper_enable_flag (or slice_reshaper_enable_flag) may indicate whether the reshaping model is used for the current tile group (or slice). For example, if tile_group_reshaper_enable_flag (or slice_reshaper_enable_flag) is 0 (or false), it may be indicated that the reshaping model is not used for the current tile group (or the current slice). If tile_group_reshaper_enable_flag (or slice_reshaper_enable_flag) is 1 (or true), it may be indicated that the reshaping model is used for the current tile group (or slice).

As one example, tile_group_reshaper_model_present_flag (or slice_reshaper_model_present_flag) may be true (or 1) and tile_group_reshaper_enable_flag (or slice_reshaper_enable_flag) may be false (or 0). This means that the reshaping model is present but not used in the current tile group (or slice). In this case, the reshaping model can be used in the future tile groups (or slices). As another example, tile_group_reshaper_enable_flag may be true (or 1) and tile_group_reshaper_model_present_flag may be false (or 0). In such a case, the decoder uses the reshaper from the previous initialization.

When the reshaping model (i.e., tile_group_reshaper_model( ) or slice_reshaper_model( ) and tile_group_reshaper_enable_flag (or slice_reshaper_enable_flag) are parsed, it may be determined (evaluated) whether conditions necessary for chroma scaling are present. The above conditions includes a condition 1 (the current tile group/slice has not been intra-coded) and/or a condition 2 (the current tile group/slice has not been partitioned into two separate coding quad tree structures for luma and chroma, i.e. the block structure for The current tile group/slice is not a dual tree structure). If the condition 1 and/or the condition 2 are true and/or tile_group_reshaper_enable_flag (or slice_reshaper_enable_flag) is true (or 1), then tile_group_reshaper_chroma_residual_scale_flag (or slice_reshaper_chroma_residual_scale_flag) may be parsed. When tile_group_reshaper_chroma_residual_scale_flag (or slice_reshaper_chroma_residual_scale_flag) is enabled (if 1 or true), it may be indicated that chroma residual scaling is enabled for the current tile group (or slice). When tile_group_reshaper_chroma_residual_scale_flag (or slice_reshaper_chroma_residual_scale_flag) is disabled (if 0 or false), it may be indicated that chroma residual scaling is disabled for the current tile group (or slice).

The purpose of the tile group reshaping model is to parse the data that would be necessary to construct the lookup tables (LUTs). These LUTs are constructed on the idea that the distribution of an allowable range of luma values can be divided into a plurality of bins (ex. 16 bins) which can be represented using a set of 16 PWL system of equations. Therefore, any luma value that lies within a given bin can be mapped to an altered luma value.

Figure 8:
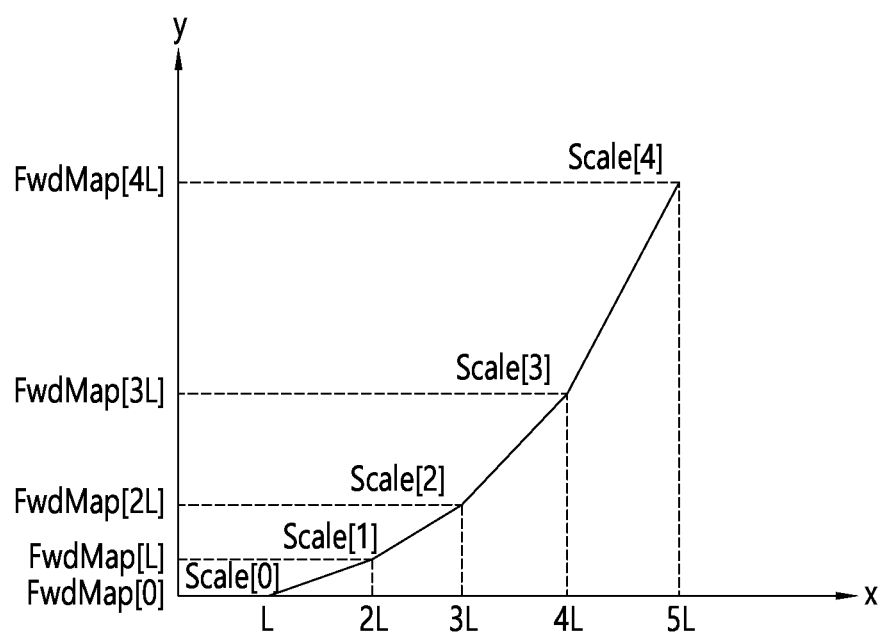
FIG. 8 shows a graph representing an exemplary forward mapping.

FIG. 8 shows a graph representing an exemplary forward mapping. In FIG. 8, five bins are illustrated exemplarily.

Referring to FIG. 8, the x-axis represents input luma values, and the y-axis represents altered output luma values. The x-axis is divided into 5 bins or slices, each bin of length L. That is, the five bins mapped to the altered luma values have the same length. The forward lookup table (FwdLUT) may be constructed using data (i.e., reshaper data) available from the tile group header, and thus mapping may be facilitated.

In one embodiment, output pivot points associated with the bin indices may be calculated. The output pivot points may set (mark) the minimum and maximum boundaries of the output range of the luma codeword reshaping. The calculation process of the output pivot points may be performed by computing a piecewise cumulative distribution function (CDF) of the number of codewords. The output pivot range may be sliced based on the maximum number of bins to be used and the size of the lookup table (FwdLUT or InvLUT). As one example, the output pivot range may be sliced based on a product between the maximum number of bins and the size of the lookup table (size of LUT*maximum number of bin indices). For example, if the product between the maximum number of bins and the size of the lookup table is 1024, the output pivot range may be sliced into 1024 entries. This serration of the output pivot range may be performed (applied or achieved) based on (using) a scaling factor. In one example, the scaling factor may be derived based on Equation 1 below.

$$SF=(y2-y1)*(1<<FP\_PREC)+c \quad \text{[Equation 1]}$$

In Equation 1, SF denotes a scaling factor, and y1 and y2 denote output pivot points corresponding to each bin. Also, FP_PREC and c may be predetermined constants. The scaling factor determined based on Equation 1 may be referred to as a scaling factor for forward reshaping.

In another embodiment, with respect to inverse reshaping (inverse mapping), for a defined range of the bins to be used (i.e., from reshaper_model_min_bin_idx to reshape_model_max_bin_idx), the input reshaped pivot points which correspond to the mapped pivot points of the forward LUT and the mapped inverse output pivot points (given by bin index under consideration*number of initial codewords) are fetched. In another example, the scaling factor SF may be derived based on Equation 2 below.

$$SF=(y2-y1)*(1<<FP\_PREC)/(x2-x1) \quad \text{[Equation 2]}$$

In Equation 2, SF denotes a scaling factor, x1 and x2 denote input pivot points, and y1 and y2 denote output pivot points corresponding to each piece (bin) (output pivot points of the inverse mapping). Here, the input pivot points may be pivot points mapped based on a forward lookup table (FwdLUT), and the output pivot points may be pivot points inverse-mapped based on an inverse lookup table (InvLUT). Also, FP_PREC may be a predetermined constant value. FP_PREC of Equation 2 may be the same as or different from FP_PREC of Equation 1. The scaling factor determined based on Equation 2 may be referred to as a scaling factor for inverse reshaping. During inverse reshaping, partitioning of input pivot points may be performed based on the scaling factor of Equation 2. The scaling factor SF is used to slice the range of input pivot points. Based on the partitioned input pivot points, bin indices in the range from 0 to the minimum bin index (reshaper_model_min_bin_idx) and/or from the minimum bin index (reshaper_model_min_bin_idx) to the maximum bin index (reshape_model_max_bin_idx) are assigned the pivot values that correspond to the minimum and maximum bin values.

Table 7 below shows the syntax of the reshaper model according to an embodiment. The reshaper model may be referred to as a reshaping model or an LMCS model. Here, the reshaper model has been exemplarily described as a tile group reshaper, but the present document is not necessarily limited by this embodiment. For example, the reshaper model may be included in the APS, or the tile group reshaper model may be referred to as a slice reshaper model or LMCS data. Also, the prefix reshaper_model or Rsp may be used interchangeably with lmcs. For example, in the following tables and the description below, reshaper_model_min_bin_idx, reshaper_model_delta_max_bin_idx, reshaper_model_max_bin_idx, RspCW, RsepDeltaCW may be used interchangeably with lmcs_min_bin_idx, lmcs_delta_cs_bin_jdx, lmx, lmcs_delta_csDcselta_idx, lmx, respectively.

TABLE 7

| | Descriptor |
|---|---|
| tile_group_reshaper_model ( ) { | |
|   reshaper_model_min_bin_idx | ue(v) |
|   reshaper_model_delta_max_bin_idx | ue(v) |
|   reshaper_model_bin_delta_abs_cw_prec_minus1 | ue(v) |
|   for ( i = reshaper_model_min_bin_idx; i <= reshaper_model_max_bin_idx, i++ ) { | |
|     reshaper_model_bin_delta_abs_CW [ i ] | u(v) |
|     if ( reshaper_model_bin_delta_abs_CW[ i ] ) > 0 ) | |
|       reshaper_model_bin_delta_sign_CW_flag[ i ] | u(1) |
|   } | |
| } | |

The semantics of syntax elements included in the syntax of Table 7 may include, for example, matters disclosed in the following table.

TABLE 8 reshape_model_min_bin_idx specifies the minimum bin (or piece) index to be used in the reshaper construction process. The value of reshape_model_min_bin_idx shall be in the range of 0 to MaxBinIdx, inclusive. The value of MaxBinIdx shall be equal to 15.
reshape_model_delta_max_bin_idx specifies the maximum allowed bin (or piece) index MaxBmIdx minus the maximum bin index to be used in the reshaper construction process. The value of reshape_model_max_bin_idx is set equal to
MaxBinIdx − reshape_model_delta_max_bin_idx.
reshape_model_bin_delta_abs_cw_prec_minus1 plus 1 specifies the number of bits used for the representation of the syntax reshape_model_bin_delta_abs_CW[ i ].
reshape_model_bin_delta_abs_CW[ i ] specifies the absolute delta codeword value for the ith bin.
reshape_model_bin_delta_sign_CW_flag[ i ] specifies the sign of
reshape_model_bin_delta_abs_CW[ i ] as follows:
- If reshape_model_bin_delta_sign_CW_flag[ i ] is equal to 0, the corresponding variable RspDeltaCW[ i ] is a positive value.
- Otherwise ( reshape_model_bin_delta_sign_CW_flag[ i ] is not equal to 0 ), the corresponding variable RspDeltaCW[ i ] is a negative value.
The variable OrgCW is derived as follows:
  OrgCW = (1 << BitDepthY ) / 16
When reshape_model_bin_delta_sign_CW_flag[ i ] is not present, it is inferred to be equal to 0.
The variable RspDeltaCW[ i ] = (1 − 2*reshape_model_bin_delta_sign_CW
[ i ]) * reshape_model_bin_delta_abs_CW [ i ];
The variable RspCW[ i ] is derived as following steps:
The variable OrgCW is set equal to (1 << BitDepth$_Y$) / ( MaxBinIdx + 1).
- If reshape_model_min_bin_idx < = i <= reshape_model_max_bin_idx
RspCW[ i ] = OrgCW + RspDeltaCW[ i ].
- Otherwise, RspCW[ i ] = 0.
The value of RspCW[ i ] shall be in the range of (OrgCW>>3) to (OrgCW<<3 − 1), inclusive. The variables InputPivot[ i ] with i in the range of 0 to MaxBinIdx + 1, inclusive are derived as follows:
  InputPivot[ i ] = i * OrgCW
    The variable ReshapePivot[ i ] with i in the range of 0 to MaxBinIdx + 1, inclusive, the variable ScaleCoef[ i ] and InvScaleCoeff[ i ]with i in the range of 0 to MaxBinIdx , inclusive, are derived as follows:
    shiftY = 11

TABLE 8-continued

```
    ReshapePivot[ 0 ] = 0;
    for( i = 0; i <= MaxBinIdx ; i++) {
        ReshapePivot[ i + 1 ] = ReshapePivot[ i ] + RspCW[ i ]
            ScaleCoef[ i ] = ( RspCW[ i ] * (1 << shiftY) + (1 << (Log2(OrgCW) − 1))) >>
    (Log2(OrgCW))
        if ( RspCW[ i ] == 0 )
            InvScaleCoeff[ i ] = 0
        else
            InvScaleCoeff[ i ] = OrgCW * (1 << shiftY) / RspCW[ i ]
    }
The variable ChromaScaleCoef[ ] with i in the range of 0 to MaxBinIdx , inclusive, are
derived as follows:
if ( lmcsCW[ i ] = = 0 )
    ChromaScaleCoeff[ i ] = (1 << 11)
else
    ChromaScaleCoeff[ i ] = InvScaleCoeff[ i ]
```

The inverse mapping process for the luma sample according to the present document may be described in a form of the standard document as shown in the table below.

TABLE 9

Inverse mapping process for a luma sample

Input to this process is a luma sample lumaSample.
Output of this process is a modified luma sample invLumaSample.
The value of invLumaSample is derived as follows:
- If slice_lmcs_enabled_flag of the slice that contains the luma sample lumaSample is equal
  to 1, the following ordered steps apply:
  1. The variable idxYInv is derived by invoking the identification of piece-wise function
     index process for a luma sample as specified in clause 8.8.2.3 with lumaSample as the input
     and idxYInv as the output.
  2. The variable invSample is derived as follows:
     invSample = InputPivot[ idxYInv ] + ( InvScaleCoeff[ idxYInv ] *
       ( lumaSample − LmcsPivot[ idxYInv ] ) + ( 1 << 10 ) ) >> 11
  3. The inverse mapped luma sample invLumaSample is derived as follows:
     invLumaSample = Clip1Y( invSample )
- Otherwise, invLumaSample is set equal to lumaSample.

Identification of a piecewise function index process for a luma sample according to the present document may be described in a form of the standard document as shown in the table below. In Table 10, idxYInv may be referred to as an inverse mapping index, and the inverse mapping index may be derived based on reconstructed luma samples (lumaSample).

TABLE 10

Identification of piecewise function index process for a luma sample

Input to this process is a luma sample lumaSample.
Output of this process is an index idxYInv identifing the piece to which
the luma sample lumaSample belongs.
The variable idxYInv is derived as follows:
if ( lumaSample < LmcsPivot[ lmcs_min_bin_idx + 1 ] )
    idxYInv = lmcs_min_bin_idx
else if ( lumaSample >= LmcsPivot[ LmcsMaxBinIdx ] )
    idxYInv = LmcsMaxBinIdx
else {
    for( idxYInv = lmcs_min_bin_idx; idxYInv < LmcsMaxBinIdx;
    idxYInv++ ) {
        if( lumaSample < LmcsPivot [ idxYInv + 1 ] )
            break
    }
}

Luma mapping may be performed based on the above-described embodiments and examples, and the above-described syntax and components included therein may be merely exemplary representations, and embodiments in the present document are not limited by the above-mentioned tables or equations. Hereinafter, a method for performing chroma residual scaling (scaling for chroma components of residual samples) based on luma mapping is described.

The (luma-dependent) Chroma residual scaling is designed to compensate for the interaction between the luma signal and its corresponding chroma signals. For example, whether chroma residual scaling is enabled or not is also signalled at the tile group level. In one example, if luma mapping is enabled and if dual tree partition (also known as separate chroma tree) is not applied to the current tile group, an additional flag is signalled to indicate if the luma-dependent chroma residual scaling is enabled or not. In other example, when luma mapping is not used, or when dual tree partition is used in the current tile group, luma-dependent chroma residual scaling is disabled. In another example, the luma-dependent chroma residual scaling is always disabled for the chroma blocks whose area is less than or equal to 4.

The chroma residual scaling may be based on an average value of a corresponding luma prediction block (a luma component of a prediction block to which an intra prediction mode and/or an inter prediction mode is applied). Scaling operations at the encoder end and/or the decoder side may be implemented with fixed-point integer arithmetic based on Equation 3 below.

$$c'=\text{sign}(c)*((\text{abs}(c)*s+2^{CSCALE\_FP\_PREC-1})>>CSCALE\_FP\_PREC) \quad \text{[Equation 3]}$$

In Equation 3, c denotes a chroma residue (chroma residual sample, chroma component of residual sample), c' denotes a scaled chroma residual sample (scaled chroma component of a residual sample), s denotes a chroma residual scaling factor, and CSCALE_FP_PREC denotes a (predefined) constant value to specify precision.

Figure 9:
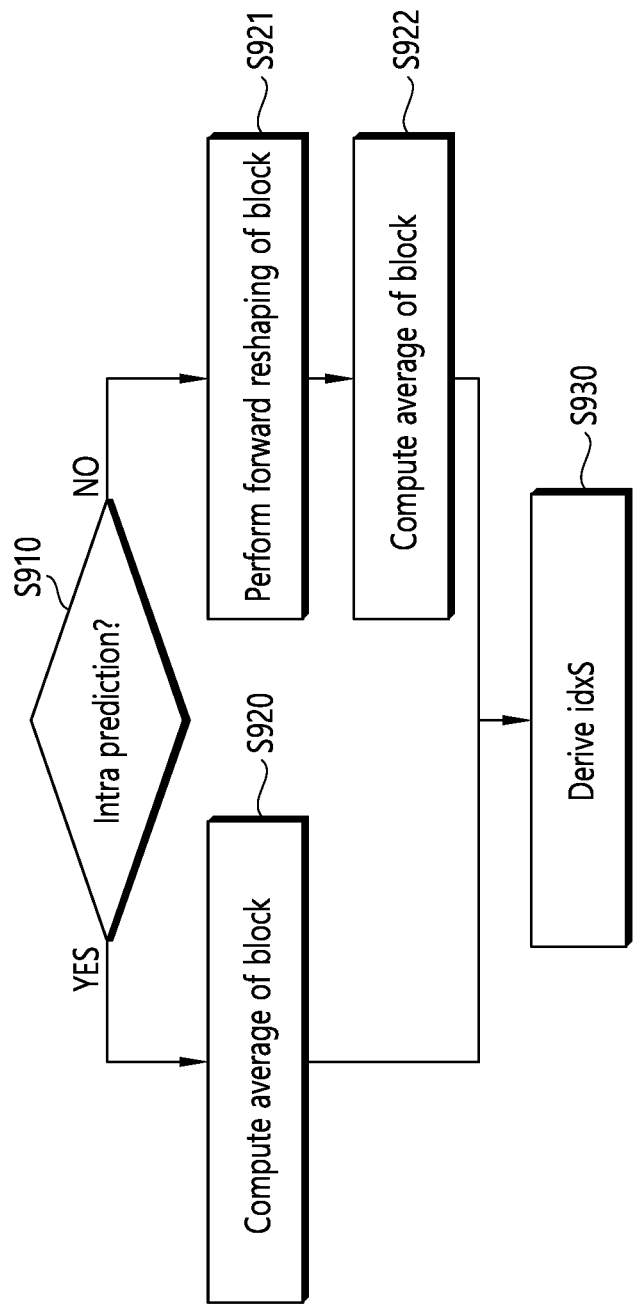
FIG. 9 is a flowchart illustrating a method for deriving a chroma residual scaling index according to an embodiment of the present document.

FIG. 9 is a flowchart illustrating a method for deriving a chroma residual scaling index according to an embodiment of the present document. The method in FIG. 9 may be performed based on FIG. 6, and tables, equations, variables, arrays, and functions included in the description related to FIG. 6.

In the step S910, it may be determined whether the prediction mode for the current block is the intra prediction mode or the inter prediction mode based on the prediction mode information. If the prediction mode is the intra prediction mode, the current block or prediction samples of the current block are considered to be already in the reshaped (mapped) region. If the prediction mode is the inter prediction mode, the current block or the prediction samples of the current block are considered to be in the original (unmapped, non-reshaped) region.

In the step S920, when the prediction mode is the intra prediction mode, an average of the current block (or luma prediction samples of the current block) may be calculated (derived). That is, the average of the current block in the already reshaped area is calculated directly. The average may also be referred to as an average value, a mean, or a mean value.

In the step S921, when the prediction mode is the inter prediction mode, forward reshaping (forward mapping) may be performed (applied) on the luma prediction samples of the current block. Through forward reshaping, luma prediction samples based on the inter prediction mode may be mapped from the original region to the reshaped region. In one example, forward reshaping of the luma prediction samples may be performed based on the reshaping model described with Table 7 above.

In the step S922, an average of the forward reshaped (forward mapped) luma prediction samples may be calculated (derived). That is, an averaging process for the forward reshaped result may be performed.

In the step S930, a chroma residual scaling index may be calculated. When the prediction mode is the intra prediction mode, the chroma residual scaling index may be calculated based on the average of the luma prediction samples. When the prediction mode is the inter prediction mode, the chroma residual scaling index may be calculated based on an average of forward reshaped luma prediction samples.

In an embodiment, the chroma residual scaling index may be calculated based on a for loop syntax. The table below shows an exemplary for loop syntax for deriving (calculating) the chroma residual scaling index.

TABLE 11

```
for( idxS = 0, idxFound = 0; idxS <= MaxBinIdx; idxS++ )
{
  if( (S < ReshapePivot[ idxS + 1 ] )
  {
    idxFound = 1
    break;
  }
}
```

In Table 11, idxS represents the chroma residual scaling index, idxFound represents an index identifying whether the chroma residual scaling index satisfying the condition of the if statement is obtained, S represents a predetermined constant value, and MaxBinIdx represents the maximum allowable bin index. ReshapPivot[idxS+1] may be derived based on Tables 7 and/or 8 described above.

In an embodiment, the chroma residual scaling factor may be derived based on the chroma residual scaling index. Equation 4 is an example for deriving the chroma residual scaling factor.

$$s = ChromaScaleCoef[idxS] \qquad \text{[Equation 4]}$$

In Equation 4, s represents the chroma residual scaling factor, and ChromaScaleCoef may be a variable (or array) derived based on Tables 7 and/or 8 described above.

As described above, the average luma value of the reference samples may be obtained, and the chroma residual scaling factor may be derived based on the average luma value. As described above, the chroma component residual sample may be scaled based on the chroma residual scaling factor, and the chroma component reconstruction sample may be generated based on the scaled chroma component residual sample.

In one embodiment of the present document, a signaling structure for efficiently applying the above-described LMCS is proposed. According to this embodiment of the present document, for example, LMCS data may be included in HLS (i.e., an APS), and through the header information (i.e., picture header, slice header) that is a lower level of the APS, an LMCS model (reshaper model) may be adaptively derived by signaling the ID of the APS, which is referred to the header information. The LMCS model may be derived based on LMCS parameters. Also, for example, a plurality of APS IDs may be signaled through the header information, and through this, different LMCS models may be applied in units of blocks within the same picture/slice.

In one embodiment according to the present document, a method for efficiently performing an operation required for LMCS is proposed. According to the semantics described above in Table 8, a division operation by the piece length lmcsCW[i] (also noted as RspCW[i] in the present document) is required to derive InvScaleCoeff[i]. The piece length of the inverse mapping may not be power of 2, that means the division cannot be performed by bit shifting.

For example, calculating InvScaleCoeff may require up to 16 divisions per slice. According to Table 8 described above, for 10 bit coding, the range of lmcsCW[i] is from 8 to 511, so to implement the division operation by lmcsCW[i] using the LUT, the size of the LUT must be 504. Also, for 12 bit coding, the range of lmcsCW[i] is from 32 to 2047, so the LUT size needs be 2016 to implement the division operation by lmcsCW[i] using the LUT. That is, division is expensive in hardware implementation, therefore it is desirable to avoid division if possible.

In one aspect of this embodiment, lmcsCW[i] may be constrained to be multiple of a fixed number (or a predetermined number or a pre-determined number). Accordingly, a lookup table (LUT) (capacity or size of the LUT) for the division may be reduced. For example, if lmcsCW[i] becomes multiple of 2, the size of the LUT to replace division process may be reduced by half.

In another aspect of this embodiment, it is proposed that for coding with higher internal bit depth coding, on the top of existing constraints "The value of lmcsCW[i] shall be in the range of (OrgCW>>3) to (OrgCW<<3−1)", further constrain lmcsCW[i] to be multiple of 1<<(BitDepthY−10) if coding bit depth is higher than 10. Here, BitDepthY may be the luma bit depth. Accordingly, the possible number of lmcsCW[i] would not vary with the coding bitdepth, and the size of LUT needed to calculate the InvScaleCoeff do not increase for higher coding bitdepth. For example, for 12-bit internal coding bitdepth, limit the values of lmcsCW[i] being multiple of 4, then the LUT to replace division process will be the same as what is to be used for 10-bit coding. This aspect can be implemented alone, but it can also be implemented in combination with the above-mentioned aspect.

In another aspect of this embodiment, lmcsCW[i] may be constrained to a narrower range. For example, lmcsCW[i] may be constrained within the range from (OrgCW>>1) to (OrgCW<<1)−1. Then for 10 bit coding, the range of lmcsCW[i] may be [32, 127], and therefore it only needs a LUT having a size of 96 to calculate InvScaleCoeff.

In another aspect of the present embodiment, lmcsCW[i] may be approximated to closest numbers being power of 2, and used that in the reshaper design. Accordingly, the division in the inverse mapping can be performed (and replaced) by bit shifting.

In one embodiment according to the present document, constraint of the LMCS codeword range is proposed. According to Table 8 described above, the values of the LMCS codewords are in the range from (OrgCW>>3) to (OrgCW<<3)−1. This codeword range is too wide. It may result in visual artifact issue when there are large differences between RspCW [i] and OrgCW.

According to one embodiment according to the present document, it is proposed to constrain the codeword of the LMCS PWL mapping to a narrow range. For example, the range of lmcsCW[i] may be in the range (OrgCW>>1) to (OrgCW<<1)−1.

In one embodiment according to the present document, use of a single chroma residual scaling factor is proposed for chroma residual scaling in LMCS. The existing method for deriving the chroma residual scaling factor uses the average value of the corresponding luma block and derives the slope of each piece of the inverse luma mapping as the corresponding scaling factor. In addition, the process to identify the piecewise index requires the availability of the corresponding luma block, it results in latency problem. This is not desirable for hardware implementation. According to this embodiment of the present document, scaling in a chroma block may not depend on a luma block value, and it may not be necessary to identify a piecewise index. Therefore, the chroma residual scaling process in the LMCS can be performed without a latency issue.

In the first aspect for this embodiment, the single chroma scaling factor may be derived from both the encoder and the decoder based on the luma LMCS information. When the LMCS luma model is received, the chroma residual scaling factor may be updated.

The table below shows an example for obtaining the single chroma scaling factor according to the first aspect of this embodiment.

TABLE 12

Sum = 0;
for( i = lmcs_min_bin_idx ; i <= lmcs_max_bin_idx ; i++ ) {
    sum += InvScaleCoeff[ i ]
}
ChromaScaleCoeff= sum / ( lmcs_max_bin_idx−
    lmcs_min_bin_idx +1);

Referring to Table 12, a single chroma scaling factor (ex. ChromaScaleCoeff) may be obtained by averaging the inverse luma mapping slopes of all pieces within the lmcs_min_bin_idx and lmcs_max_bin_idx.

The table below shows another example for obtaining a single chroma scaling factor according to the first aspect of this embodiment.

TABLE 13

Sum = 0;
for( i = lmcs_min_bin_idx ; i <= lmcs_max_bin_idx ; i++ ) {
    sum += lmcsCW[ i ]
}
Chroma ScaleCoeff= OrgCW *( lmcs_max_bin_idx−
    lmcs_min_bin_idx +1) * (1 << 11) / sum;

Referring to Table 13, the single chroma scaling factor (ex. ChromaScaleCoeff) may be obtained from two pivot points (i.e., lmcs_min_bin_idx, lmcs_max_bin_idx). For example, the inverse slope of linear mapping may be used as the chroma scaling factor.

Figure 10:
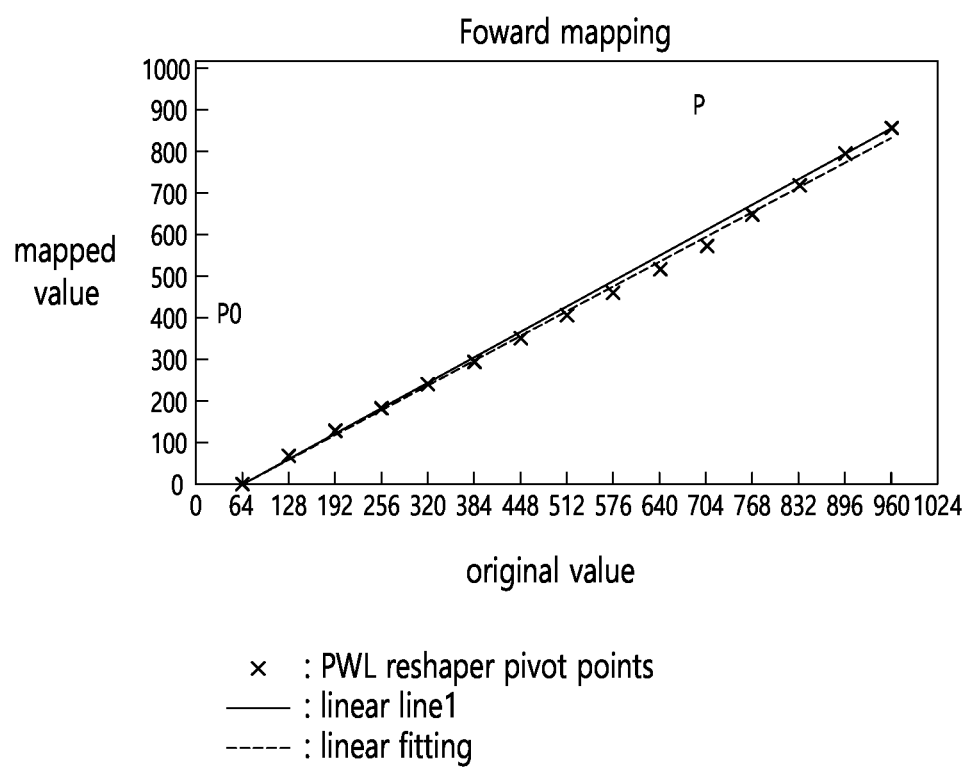
FIG. 10 illustrates a linear fitting of pivot points according to an embodiment of the present document.

FIG. 10 illustrates a linear fitting of pivot points according to an embodiment of the present document. FIG. 10 may explain another example according to the first aspect of the embodiment.

Referring to FIG. 10, in another example of this embodiment, the single chroma scaling factor may be obtained by linear fitting of pivot points to minimize an error (or mean square error) between the linear fitting and the existing PWL mapping. This example may be more accurate than simply connecting the two pivot points at lmcs_min_bin_idx and lmcs_max_bin_idx. There are many ways to find the optimal linear mapping and such example is described below.

In one example, parameters b1 and b0 of a linear fitting equation y=b1*x+b0 for minimizing the sum of least square error may be calculated based on Equations 5 and/or 6 below.

$$b1 = \frac{\sum_{i=1}^{n}(x_i - \bar{x})(y_i - \bar{y})}{\sum_{i=1}^{n}(x_i - \bar{x})^2}$$ [Equation 5]

$$b0 = \bar{y} - b_1\bar{x}$$ [Equation 6]

In Equation 7 and 8, X and y are the mean of x and y, and x, and y, represent values of the i-th pivot points. In this case, x is the original luma values, and y is the reshaped luma values.

Referring to FIG. 10, another simple approximation to identify the linear mapping is given as:
Get the linear line1 between lmcs_min_bin_idx and lmcs_max_bin_idx
Sum up the differences between the pivot points by using the linear line1 and pivot points.
Get the average difference avgDiff.
Adjust the last pivot point of the linear line according to the average difference, e.g., 2*avgDiff
Use the inverse slope of the adjusted linear line as the chroma residual scale.

According to the above-described linear fitting, the chroma scaling factor (i.e., the inverse slope of forward mapping) may be derived (obtained) based on Equation 7 or 8 below.

InvScaleCoeff=OrgCW*(1<<11)/lmcs_pivots_linear
    [lmcs_min_bin_idx+1]   [Equation 7]

InvScaleCoeff=OrgCW*(lmcs_max_bin_idx_−lmcs_
    max_bin_idx+1)*(1<<11)/lmcs_pivots_linear
    [lmcs_max_bin_idx+1]   [Equation 8]

In the above-described equations, lmcs_pivots_linear[i] may be mapped values of linear mapping. With linear mapping, all pieces of PWL mapping between minimum and maximum bin indices may have the same LMCS codeword (lmcsCW). That is, lmcs_pivots_linear[lmcs_min_bin_idx+1] may be the same as lmcsCW[lmcs_min_bin_idx].

In the second aspect for this embodiment, the encoder may determine parameters related to the single chroma scaling factor and signal the parameters to the decoder. In order to derive the chroma scaling factor in the decoder, the x value and the y value may be needed. Here, the value of x is piece lengths, for example it may be a known number (to the decoder) and may not need to be signaled. Thus, only the y value may need to be signaled for chroma scaling factor derivation. For example, the y value may be a value mapped to arbitrary pivot points of a linear mapping.

The table below shows examples of syntaxes for signaling the y value for chroma scaling factor derivation.

TABLE 14

| | Descriptor |
|---|---|
| lmcs_data ( ) { | |
|     lmcs_min_bin_idx | ue(v) |
|     lmcs_delta_max_bin_idx | ue(v) |
|     lmcs_delta_cw_prec_minus1 | ue(v) |
|     for ( i = lmcs_min_bin_idx; i <= LmcsMaxBinIdx; i++ ) { | |
|         lmcs_delta_abs_cw[ i ] | u(v) |
|         if ( lmcs_delta_abs_cw[ i ] ) > 0 ) | |
|             lmcs_delta_sign_cw_flag[ i ] | u(1) |
|     } | |
|     if(slice_chroma_residual_scale_flag) { | |
|         lmcs_delta_abs_cw_linear | u(v) |
|         if ( lmcs_delta_abs_cw_linear ) > 0 ) | |
|             lmcs_delta_sign_cw_linear_flag | u(1) |
|     } | |
| } | |

TABLE 15

| | Descriptor |
|---|---|
| lmcs_data ( ) { | |
|     lmcs_min_bin_idx | ue(v) |
|     lmcs_delta_max_bin_idx | ue(v) |
|     lmcs_delta_cw_prec_minus1 | ue(v) |
|     for ( i = lmcs_min_bin_idx; i <= LmcsMaxBinIdx; i++ ) { | |
|         lmcs_delta_abs_cw[ i ] | u(v) |
|         if ( lmcs_delta_abs_cw[ i ] ) > 0 ) | |
|             lmcs_delta_sign_cw_flag[ i ] | u(1) |
|     } | |
|     if (slice_chroma_residual_scale_flag) { | |
|         lmcs_cw_linear | u(v) |
|     } | |
| } | |

One of the syntaxes of Tables 14 and 15 described above may be used to signal the y value at any linear pivot points specified by the encoder and decoder. That is, the encoder and the decoder may derive the y value using the same syntax.

Referring to FIG. 10, P0, P2 include mapped values. lmcs_cw_linear in the above tables may denote a mapped value at P0 or P1.

In one example, if lmcs_cw_linear denotes a value mapped to P0 (i.e., lmcs_pivots_linear[lmcs_min_bin_idx+1]), the chroma scaling factor may be derived based on the following equation.

$$\text{InvScaleCoeff}=\text{OrgCW}*(1<<11)/\text{lmcs\_pivots\_linear}[\text{lmcs\_min\_bin\_idx}+1] \qquad \text{[Equation 9]}$$

In one example, if lmcs_cw_linear denotes a value mapped to P2 (i.e., lmcs_pivots_linear[lmcs_max_bin_idx+1]), the chroma scaling factor may be derived based on the following equation.

$$\text{InvScaleCoeff}=\text{OrgCW}*(\text{lmcs\_max\_bin\_idx}-\text{lmcs\_max\_bin\_idx}+1)*(1<<11)/\text{lmcs\_pivots\_linear}[\text{lmcs\_max\_bin\_idx}+1] \qquad \text{[Equation 10]}$$

Figure 11:
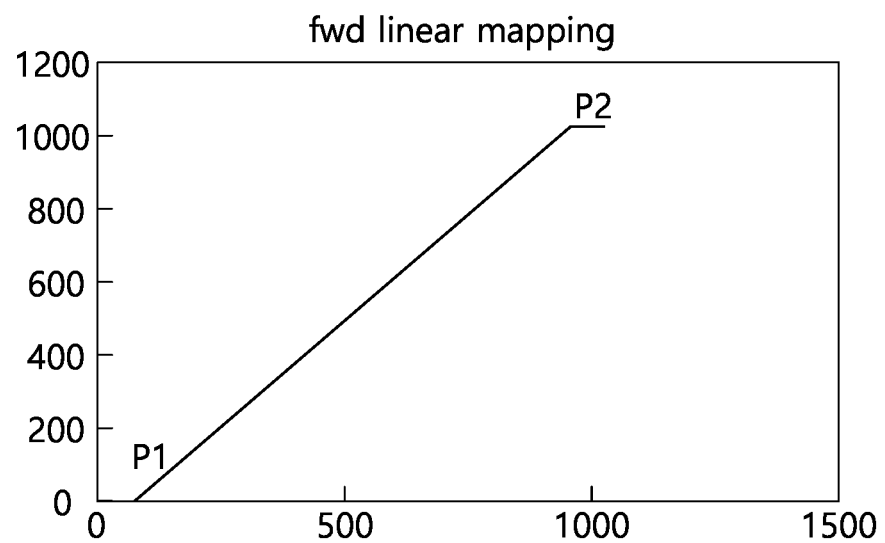
FIG. 11 illustrates one example of linear reshaping (or linear reshaping, linear mapping) according to an embodiment of the present document.

FIG. 11 illustrates one example of linear reshaping (or linear reshaping, linear mapping) according to an embodiment of the present document. That is, in this embodiment, the use of a linear reshaper in LMCS is proposed. For example, this example in FIG. 11 may relate to forward linear reshaping (mapping).

In the existing example, the LMCS may use a piecewise linear mapping with a fixed 16 pieces. This complicates the reshaper design since abrupt transition between pivot points may cause undesirable artefact. Also, for inverse luma mapping of reshaper, it requires to identify the piecewise function index. The piecewise function index identification process is an iteration process with many comparisons. Further more, for chroma residual scaling using the corresponding luma block average, it also requires such luma piecewise index identification process. This not only has the complexity issue, it also causes the latency of chroma residual scaling depending on reconstruction of whole luma block. In order to solve this problem, the use of the linear reshaper is proposed for the LMCS.

Referring to FIG. 11, the linear reshaper may include two pivot points i.e., P1 and P2. P1 and P2 may represent input and mapped values, for example P1 may be (min_input, 0) and P2 may be (max_input, max_mapped). Here, min_input represents the minimum input value, and max_input represents the maximum input value. Any input value less than or equal to min_input are mapped to 0, any input value larger than max_input are mapped to max_mapped. Any input luma values within the min_input and max_input are linearly mapped to other values. FIG. 11 shows an example of mapping. The pivot points P1, P2 may be determined at the encoder, and a linear fitting may be used to approximate the piecewise linear mapping.

There are many ways to signal the linear reshaper. In an example of a method of signaling the linear reshaper, original luma range may be divided by an equal number of bins. That is, the luma mapping between the minimum and maximum bins may be equally distributed. For example, all bins may have same LMCS codeword (lmcsCW). To this end, minimum and maximum bin indices may be signaled. Therefore, only one set of reshape_model_bin_delta_abs_CW (or reshaper_model_delta_abs_CW, lmcs_delta_abs_CW) and reshaper_model_bin_delta_sign_CW_flag (or reshaper_model_delta_sign_CW_flag_sign_CW_flag) need to be signaled. The following table exemplarily shows the syntax of the reshaper model according to this example.

TABLE 16

| | Descriptor |
|---|---|
| reshaper_model ( ) { | |
|     log2_reshape_model_num_bins_minus4 | ue(v) |
|     lmcs_min_bin_idx | ue(v) |
|     lmcs_max_bin_idx | ue(v) |
|     lmcs_delta_cw_prec_minus1 | ue(v) |
|     lmcs_delta_abs_CW | u(v) |
|     if ( lmcs_delta_abs_CW > 0 ) | |
|         lmcs_sign_CW_flag | u(1) |

Referring to Table 16, the syntax element log 2_reshape_model_num_bins_minus4 may be information on the number of bins. Based on this information, the number of bins may be signaled to allow finer control of the minimum and maximum pivot points. In another existing example, the encoder and/or decoder may derive (specify) the (fixed) number of bins without signaling, for example the number of bins may be derived as 16 or 32. However, according to the examples of Table 16, log 2_reshape_model_num_bins_minus4 plus 4 may represent a binary logarithm of the number of bins.

For example, the LMCS codeword (lmcsCWALL) may be derived based on the following equations.

lmcsDeltaCW=(1−2*lmcs_delta_sign_cw_flag)*lmcs_delta_abs_cw     [Equation 11]

lmcsCW1=OrgCW+lmcsDeltaCW     [Equation 12]

lmcsCW[i]=lmcsCW1     [Equation 13]

In Equation 13, i may have a value ranging from lmcs_min_bin_idx to lmcs_max_bin_idx. That is, it can be seen from Equation 13 that all bins have the same LMCS codeword value (i.e., lmcsCW1).

In another example of a method of signaling the linear reshaper, an LMCS codeword (lmcsCWALL) may be derived based on the following equations. Also in this example, the syntax of Table 16 described above may be used.

lmcsDeltaCWAll=(1−2*lmcs_delta_sign_cw_flag)*lmcs_delta_abs_cw     [Equation 14]

lmcsCWAll=lmcsDeltaCWAll+OrgCW*(lcms_max_bin_idx−lmcs_min_bin_idx+1)     [Equation 15]

In this example and the above-mentioned equations, the LMCS codeword is expressed as lmcsCWALL, but may be replaced with lmcsCW[i], in which case i may have any value from lmcs_min_bin_idx to lmcs_max_bin_idx. This is also the case in the following examples.

In another example of a method of signaling the linear reshaper, the pivot points P1, P2 of the linear reshaper model may be explicitly signaled. The table below exemplifies the syntax of the reshaper model according to this example.

TABLE 17

| | Descriptor |
|---|---|
| reshaper_model ( ) { | |
|    lmcs_p1_x | ue(v) |
|    lmcs_p2_x_delta | ue(v) |
|    lmcs_p2_y_delta | ue(v) |

Referring to Table 17, lmcs_p1_x may represent an input value of the first pivot point. For example, lmcs_p1_x may have a mapped value of 0. lmcs_p2_x_delta may represent a difference between the input value of the second pivot point and the maximum luma value (i.e., (1<<bitdepthY)−1). lmcs_p2_y_delta may indicate a difference between the mapped value of the second pivot point and the maximum luma value (i.e., (1<<bitdepthY)−1).

The LMCS codeword lmcsCWALL may be derived based on the syntax elements described above. For example, lmcsCWALL may be derived based on the following equation.

lmcsCWAll=lmcs_p2_y=(1<<bitdepthY)−1−lmcs_p2_y_delta     [Equation 16]

Inverse scaling for luma samples may be performed based on the above-described examples of the linear reshaper. In one example, only one inverse scaling factor may be needed for inverse scaling for luma samples. The inverse luma mapping scaling factor may be derived based on at least one of the following equations.

InvScaleCoeff=OrgCW/lmcsCW1     [Equation 17]

InvScaleCoeff=OrgCW*(lmcs_max_bin_idx−lmcs_max_bin_idx+1)/lmcsCWAll     [Equation 18]

InvScaleCoeff=(lmcs_p2_x−lmcs_p1_x)/lmcsCWAll     [Equation 19]

Based on the above-described examples of the linear reshaper, the piecewise index identification process may be omitted. That is, in the present examples, since there is only one piece having valid reshaped luma pixels, the piecewise index identification process used for inverse luma mapping and chroma residual scaling can be removed. Accordingly, the complexity of inverse luma mapping may be reduced. In addition, latency problems caused by depending on luma piecewise index identification during chroma residual scaling can be eliminated.

According to the embodiment of the use of the linear reshaper described above, the following advantages may be provided for LMCS: i) It is possible to simplify the encoder reshaper design, preventing possible artifact by abrupt changes between the piecewise linear pieces ii) The decoder inverse mapping process, in which the piecewise index identification process can be removed, can be simplified by eliminating the piecewise index identification process iii) By removing the piecewise index identification process, it is possible to remove the latency problem in the chroma residual scaling caused by depending on the corresponding luma blocks iv) It is possible to reduce overhead of signaling, and make frequent update of reshaper more feasible v) For many places that used to require of a loop of 16 pieces, the loop can be eliminated. For example, to derive InvScaleCoeff[i], the number of division operations by lmcsCW[i] can be reduced to 1.

The following drawings are created to explain specific examples of the present specification. Since the names of specific devices described in the drawings or the names of specific signals/messages/fields are presented by way of example, the technical features of the present specification are not limited to the specific names used in the following drawings.

Figure 12:
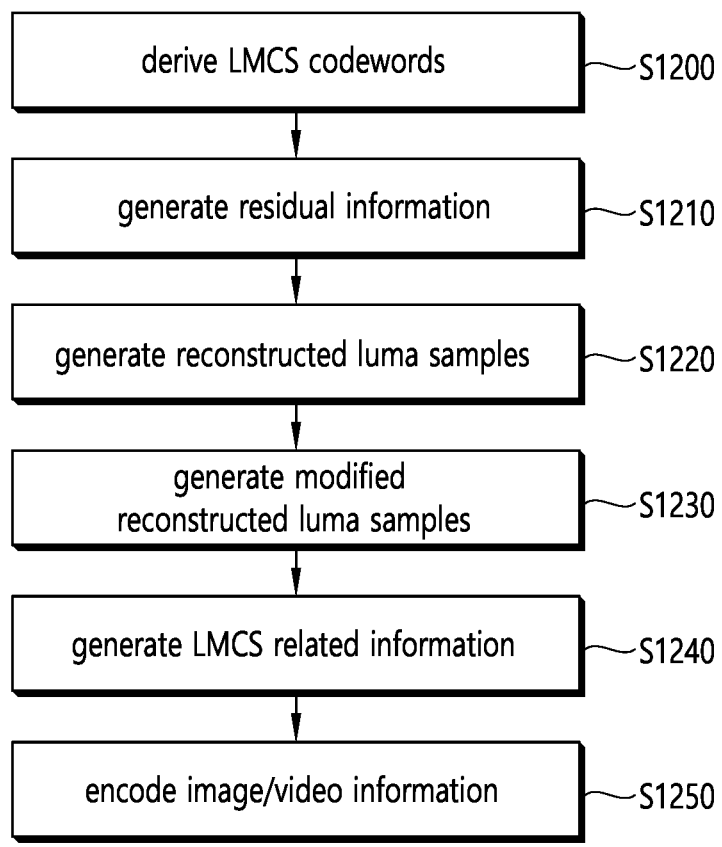
FIG. 12 and FIG. 13 schematically show an example of a video/image encoding method and related components according to embodiment(s) of the present document.
Figure 13:
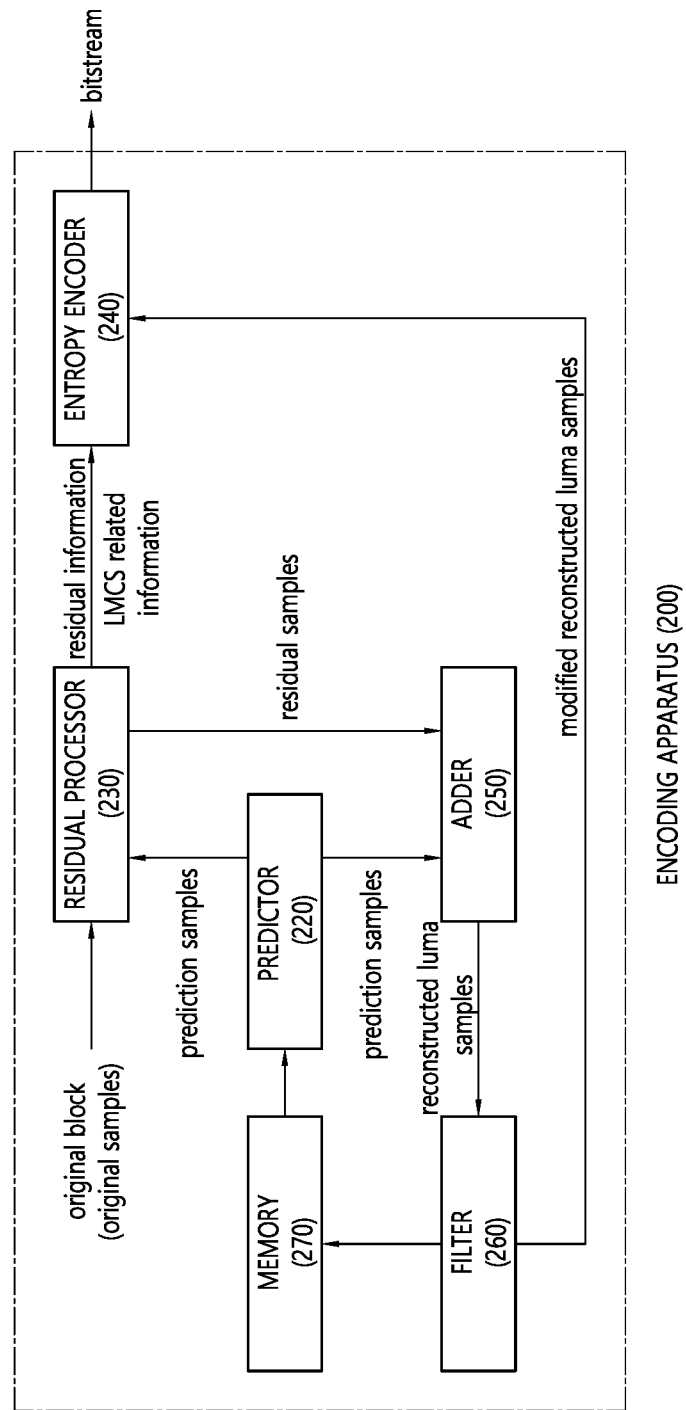

FIG. 12 and FIG. 13 schematically show an example of a video/image encoding method and related components according to embodiment(s) of the present document. The method disclosed in FIG. 12 may be performed by the encoding apparatus disclosed in FIG. 2. Specifically, for example, S1200 may be performed by the residual processor 230, the adder 250 and/or the filter 260 of the encoding apparatus, S1210 may be performed by the residual processor 230 of the encoding apparatus, S1220 may be performed by the adder 250 of the encoding apparatus, S1230 may be performed by the filter 260 of the encoding apparatus, S1240 may be performed by the residual processor 230, the adder 250 and/or the filter 260 of the encoding apparatus, and S1250 may be performed by the entropy encoder 240 of the encoding apparatus. The method disclosed in FIG. 12 may include the embodiments described above in the present document.

Referring to FIG. 12, the encoding apparatus may derive at least one LMCS codeword (S1200). In one example, the at least one LMCS codeword may be generated based on the original codeword based on the luma bit depth. For example, the number of at least one LMCS codeword may be equal to the number of bins used for the LMCS. The encoding apparatus may derive one LMCS codeword for one bin based on the linear mapping.

The encoding apparatus may generate residual information (S1210). The encoding apparatus may derive residual samples for the current block, and the residual samples for the current block may be derived based on original samples and prediction samples of the current block. Specifically, the encoding apparatus may derive the prediction samples of the current block based on the prediction mode. In this case, various prediction methods disclosed in the present document, such as inter prediction or intra prediction, may be applied. Residual samples may be derived based on the prediction samples and the original samples. The encoding apparatus may derive transform coefficients based on a transform procedure for the residual samples. For example, the transform process may include at least one of DCT, DST, GBT, or CNT. The encoding apparatus may derive quantized transform coefficients based on the quantization process for the transform coefficients. The quantized transform coefficients may have a one-dimensional vector form based on the coefficient scan order. The encoding apparatus may generate residual information specifying the quantized transform coefficients. The residual information may be generated through various encoding methods such as exponential Golomb, CAVLC, CABAC, and the like.

The encoding apparatus may generate reconstructed luma samples (S1220). The encoding apparatus may generate reconstructed luma samples based on the at least one LMCS codeword and the residual information. The reconstructed luma samples may be generated based on residual samples based on residual information and prediction samples. For example, the reconstructed luma samples may be generated based on the summation between prediction samples mapped according to forward mapping and residual samples.

The encoding apparatus may generate modified reconstructed luma samples (S1230). The encoding apparatus may generate modified reconstructed luma samples based on the reconstructed luma samples and the at least one LMCS codeword. For example, the modified reconstructed luma samples may be generated according to the features described in Tables 7 to 10 described above.

The encoding apparatus may derive LMCS related information (S1240). The encoding apparatus may generate LMCS related information for the reconstructed samples. The encoding apparatus may derive LMCS related parameters that can be applied for filtering the reconstructed samples, and may generate LMCS related information based on the LMCS related parameters. For example, the LMCS related information may include information on the luma mapping (i.e., forward mapping, inverse mapping, linear mapping), information on chroma residual scaling, and/or indices (i.e., a maximum bin index, a minimum bin index) related to LMCS (or reshaping, reshaper).

The encoding apparatus may encode the video/image information (S1250). The image information may include LMCS related information and/or residual information. For example, the LMCS related information may include information on the linear mapping. In one example, at least one LMCS codeword may be derived based on information on the linear mapping. The encoded video/image information may be output in the form of a bitstream. The bitstream may be transmitted to the decoding device through a network or a storage medium.

The image/video information may include various information according to an embodiment of the present document. For example, the image/video information may include information disclosed in at least one of Tables 1, 3, 4, 7, 14, 15, 16 and/or 17 described above.

In one embodiment, an LMCS delta codeword may be derived based on at least one LMCS codeword and an original codeword (OrgCW). In one example, the information on the linear mapping may include information on the LMCS delta codeword.

In one embodiment, the at least one LMCS codeword may be derived based on the summation of the LMCS delta codeword and OrgCW, for example, OrgCW may be (1<<BitDepthY)/16, where BitDepthY may be a luma bit depth. This embodiment may be based on Equation 12.

In one embodiment, the at least one LMCS codeword may be derived based on the summation of the LMCS delta codeword and OrgCW*(lmcs_max_bin_idx−lmcs_min_bin_idx+1), and lmcs_max_bin_idx and lmcs_min_bin_idx may be a maximum bin index and a minimum bin index, respectively, and OrgCW may be (1<<BitDepthY)/16. This embodiment may be based on Equation 15.

In one embodiment, the information on the linear mapping may include information on two pivot points. For example, the two pivot points may include a first pivot point (P1 in FIG. 11) and a second pivot point (P2 in FIG. 11). The x value and y value of the first pivot point are a minimum input value (minInput) and a minimum mapping value (i.e., 0), respectively, and the x value and the y value of the second pivot point are a maximum input value (maxInput) and the maximum mapping value (maxMapped), respectively. Input values between the minimum input value and the maximum input value may be linearly mapped.

In one embodiment, the information on the linear mapping may include the x delta value (lmcs_p1_x_delta) of the first pivot point and the y delta value (lmcs_p2_y_delta) of the second pivot point, and the maximum input value (maxInput) may be derived based on the x delta value (lmcs_p2_x_delta) of the second pivot point, and the maximum mapping value (i.e., lmcsCWALL, lmcs_p2_y in Equation 16) may be derived based on the y delta value (lmcs_p2_y_delta) of the second pivot point.

In one embodiment, reconstructed chroma samples may be derived based on the LMCS related information, and the reconstructed chroma samples may be derived based on a single chroma residual scaling factor. Through the derivation of reconstructed chroma samples based on the single chroma residual scaling factor, scaling in a chroma block may not depend on a luma block value and piecewise index identification may not be required. Therefore, the chroma residual scaling process in the LMCS may be performed without a latency issue.

In one embodiment, the single chroma residual scaling factor may be derived based on an average of inverse mapping gradients (slopes) for deriving the modified reconstructed luma samples. For example, this embodiment may be based on Table 12 described above.

In one embodiment, a gradient reciprocal (slope reciprocal) of the linear mapping may be used as the single chroma residual scaling factor based on the information on the linear mapping. For example, this embodiment may be based on Table 13 described above.

In one embodiment, the LMCS related information may include information on the parameters for the single chroma residual scaling factor, and the single chroma residual scaling factor may be derived based on the parameters for the single chroma residual scaling factor. For example, the parameters for the single chroma residual scaling factor may include lmcs_cw_linear included in Table 14 or 15 described above, a value mapped to arbitrary pivot points of linear mapping, a y value at arbitrary linear pivot points, lmcs_pivots_linear [lmcs_max_bin_idx+1] and lmcs_pivots_linear [lmcs_min_bin_idx+1].

In one embodiment, the at least one LMCS codeword may be a multiple of two.

In one embodiment, when the luma bit depth (BitDepthY) of the reconstructed luma samples is higher than 10, the at least one LMCS codeword may be a multiple of 1<< (BitDepthY−10).

In one embodiment, the at least one LMCS codeword may be in the range from (OrgCW>>1) to (OrgCW<<1)−1.

Figure 14:
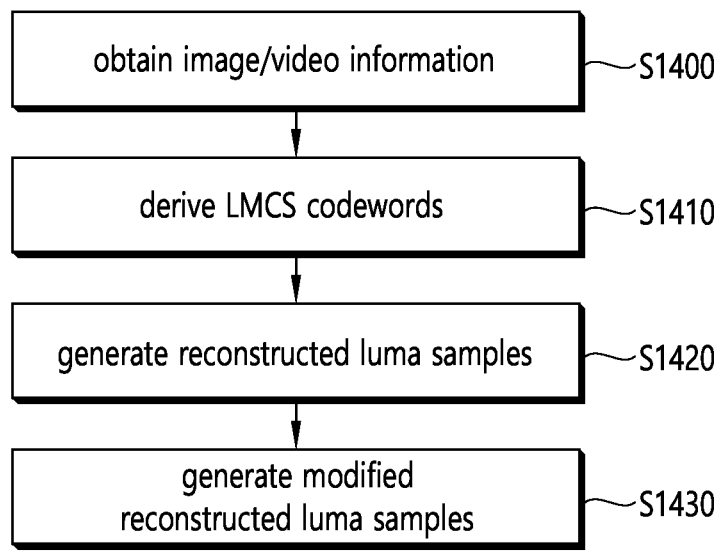
FIG. 14 and FIG. 15 schematically show an example of an image/video decoding method and related components according to an embodiment of the present document.
Figure 15:
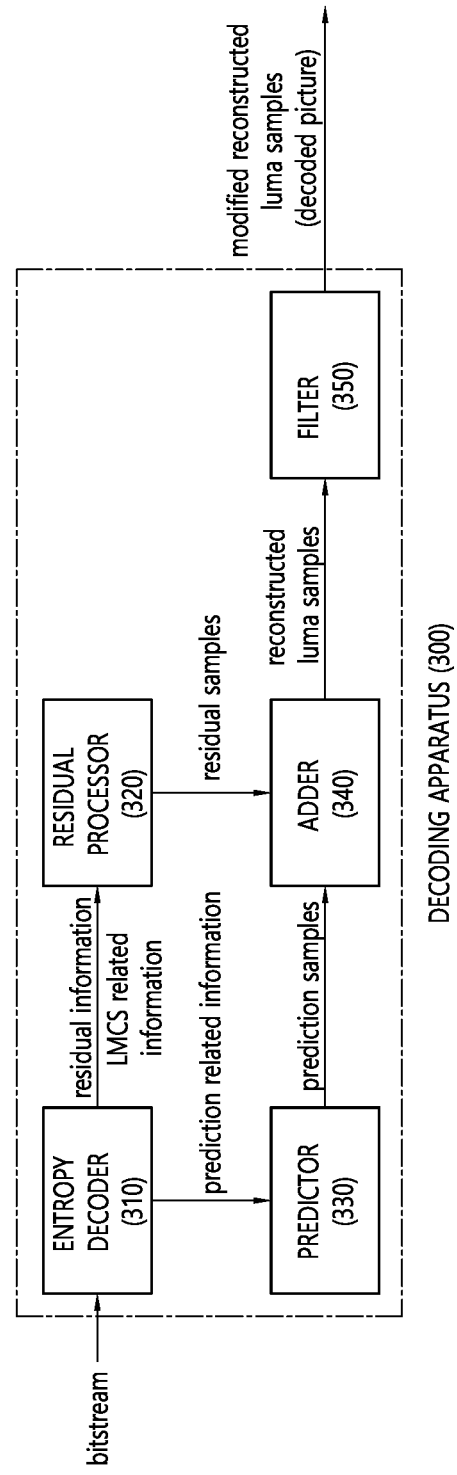

FIG. 14 and FIG. 15 schematically show an example of an image/video decoding method and related components according to an embodiment of the present document. The method disclosed in FIG. 14 may be performed by the decoding apparatus illustrated in FIG. 3. Specifically, for example, S1400 of FIG. 14 may be performed by the entropy decoder 310 of the decoding apparatus, S1410 may be performed by the residual processor 320, the adder 340, and/or the filter 350 of the decoding apparatus, S1420 may be performed by the adder 340 of the decoding apparatus, and S1430 may be performed by the filter 350 of the decoding apparatus. The method disclosed in FIG. 14 may include the embodiments described above in the present document.

Referring to FIG. 14, the decoding apparatus may receive/obtain video/image information (S1400). The video/image information may include LMCS related information. For example, the LMCS related information may include information on the luma mapping (i.e., forward mapping, inverse mapping, linear mapping), information on chroma residual scaling, and/or indices (i.e., a maximum bin index, a minimum bin index) related to LMCS (or reshaping, reshaper). The decoding apparatus may receive/obtain the image/video information through a bitstream.

The image/video information may include various information according to an embodiment of the present document. For example, the image/video information may include information disclosed in at least one of Tables 1, 3, 4, 7, 14, 15, 16 and/or 17 described above.

The decoding apparatus may derive at least one LMCS codeword (S1410). The decoding apparatus may derive at least one LMCS codeword for the LMCS process based on the LMCS related information. In one example, the at least one LMCS codeword may be generated based on an original codeword based on a luma bit depth. The at least one LMCS codeword may be derived based on the features described together with Tables 7 and 8 described above. For example, the number of the at least one LMCS codeword may be the same as the number of bins used for the LMCS. The decoding apparatus may derive one LMCS codeword for one bin based on the linear mapping.

The decoding apparatus may generate reconstructed luma samples (S1420). The decoding apparatus may generate reconstructed luma samples based on the at least one LMCS codeword. Specifically, the decoding apparatus may generate prediction samples by performing prediction on the current block, and may derive residual samples based on residual information included in the image information. Reconstructed luma samples may be generated based on residual samples and prediction samples. For example, the reconstructed luma samples may be generated based on the summation between predicted samples and residual samples mapped according to forward mapping using the at least one LMCS codeword.

The decoding apparatus may generate modified reconstructed luma samples (S1430). The decoding apparatus may generate modified reconstructed luma samples based on the reconstructed luma samples and the at least one LMCS codeword. For example, the modified reconstructed luma samples may be generated according to the features described in Tables 7 to 10 described above.

In one embodiment, the LMCS related information may include information on linear mapping. In an example, the at least one LMCS codeword may be derived based on the information on the linear mapping.

In one embodiment, an LMCS delta codeword may be derived based on the information on the linear mapping.

In one embodiment, the at least one LMCS codeword may be derived based on the summation of the LMCS delta codeword and OrgCW, for example, OrgCW may be (1<<BitDepthY)/16, where BitDepthY may be a luma bit depth. This embodiment may be based on Equation 12.

In one embodiment, the at least one LMCS codeword may be derived based on the summation of the LMCS delta codeword and OrgCW*(lmcs_max_idx−lmcs_min_bin_idx+1), and lmcs_max_bin_idx and lmcs_min_bin_idx may be a maximum bin index and a minimum bin index, respectively, and OrgCW may be (1<<BitDepthY)/16. This embodiment may be based on Equation 15.

In one embodiment, information on two pivot points may be derived based on the information on the linear mapping. For example, the two pivot points may include a first pivot point (P1 in FIG. 11) and a second pivot point (P2 in FIG. 11). The x value and y value of the first pivot point are a minimum input value (minInput) and a minimum mapping value (i.e., 0), respectively, and the x value and the y value of the second pivot point are a maximum input value (maxInput) and the maximum mapping value (maxMapped), respectively. Input values between the minimum input value and the maximum input value may be linearly mapped.

In one embodiment, the x delta value (lmcs_p1_x_delta) of the first pivot point and the y delta value (lmcs_p2_y_delta) of the second pivot point may signaled based on the information on the linear mapping, and the maximum input value (maxInput) may be derived based on the x delta value (lmcs_p2_x_delta) of the second pivot point, and the maximum mapping value (i.e., lmcsCWALL, lmcs_p2_y in Equation 16) may be derived based on the y delta value (lmcs_p2_y_delta) of the second pivot point.

In one embodiment, reconstructed chroma samples may be derived based on the LMCS related information, and the reconstructed chroma samples may be derived based on a single chroma residual scaling factor. Through the derivation of reconstructed chroma samples based on the single chroma residual scaling factor, scaling in a chroma block may not depend on a luma block value and piecewise index identification may not be required. Therefore, the chroma residual scaling process in the LMCS may be performed without a latency issue.

In one embodiment, the single chroma residual scaling factor may be derived based on an average of inverse mapping gradients (slopes) for deriving the modified reconstructed luma samples. For example, this embodiment may be based on Table 12 described above.

In one embodiment, a gradient reciprocal (slope reciprocal) of the linear mapping may be used as the single chroma residual scaling factor based on signaling of the information on the linear mapping. For example, this embodiment may be based on Table 13 described above.

In one embodiment, the parameters for the single chroma residual scaling factor may be signaled based on the LMCS related information, and the single chroma residual scaling factor may be derived based on the parameters for the single chroma residual scaling factor. For example, the parameters for the single chroma residual scaling factor may include lmcs_cw_linear included in Table 14 or 15 described above, a value mapped to arbitrary pivot points of linear mapping, a y value at arbitrary linear pivot points, lmcs_pivots_linear[lmcs_max_bin_idx+1] and lmcs_pivots_linear[lmcs_min_bin_idx+1].

In one embodiment, the at least one LMCS codeword may be a multiple of two.

In one embodiment, when the luma bit depth (BitDepthY) of the reconstructed luma samples is higher than 10, the at least one LMCS codeword may be a multiple of 1<<(BitDepthY−10).

In one embodiment, the at least one LMCS codeword may be in the range from (OrgCW>>1) to (OrgCW<<1)−1.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the above-described embodiments of the present document may be implemented in software form, and the encoding device and/or decoding device according to the present document is, for example, may be included in the device that performs the image processing of a TV, a computer, a smart phone, a set-top box, a display device, etc.

When the embodiments in the present document are implemented in software, the above-described method may be implemented as a module (process, function, etc.) that performs the above-described function. A module may be stored in a memory and executed by a processor. The memory may be internal or external to the processor, and may be coupled to the processor by various well-known means. The processor may include an application-specific integrated circuit (ASIC), other chipsets, logic circuits, and/or data processing devices. Memory may include read-only memory (ROM), random access memory (RAM), flash memory, memory cards, storage media, and/or other storage devices. That is, the embodiments described in the present document may be implemented and performed on a processor, a microprocessor, a controller, or a chip. For example, the functional units shown in each figure may be implemented and performed on a computer, a processor, a microprocessor, a controller, or a chip. In this case, information on instructions or an algorithm for implementation may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (i.e., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present document is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (i.e., transmission through the Internet). In addition, a bitstream generated by the encoding method may be stored in a computer-readable recording medium or may be transmitted over wired/wireless communication networks.

In addition, the embodiments of the present document may be implemented with a computer program product according to program codes, and the program codes may be performed in a computer by the embodiments of the present document. The program codes may be stored on a carrier which is readable by a computer.

Figure 16:
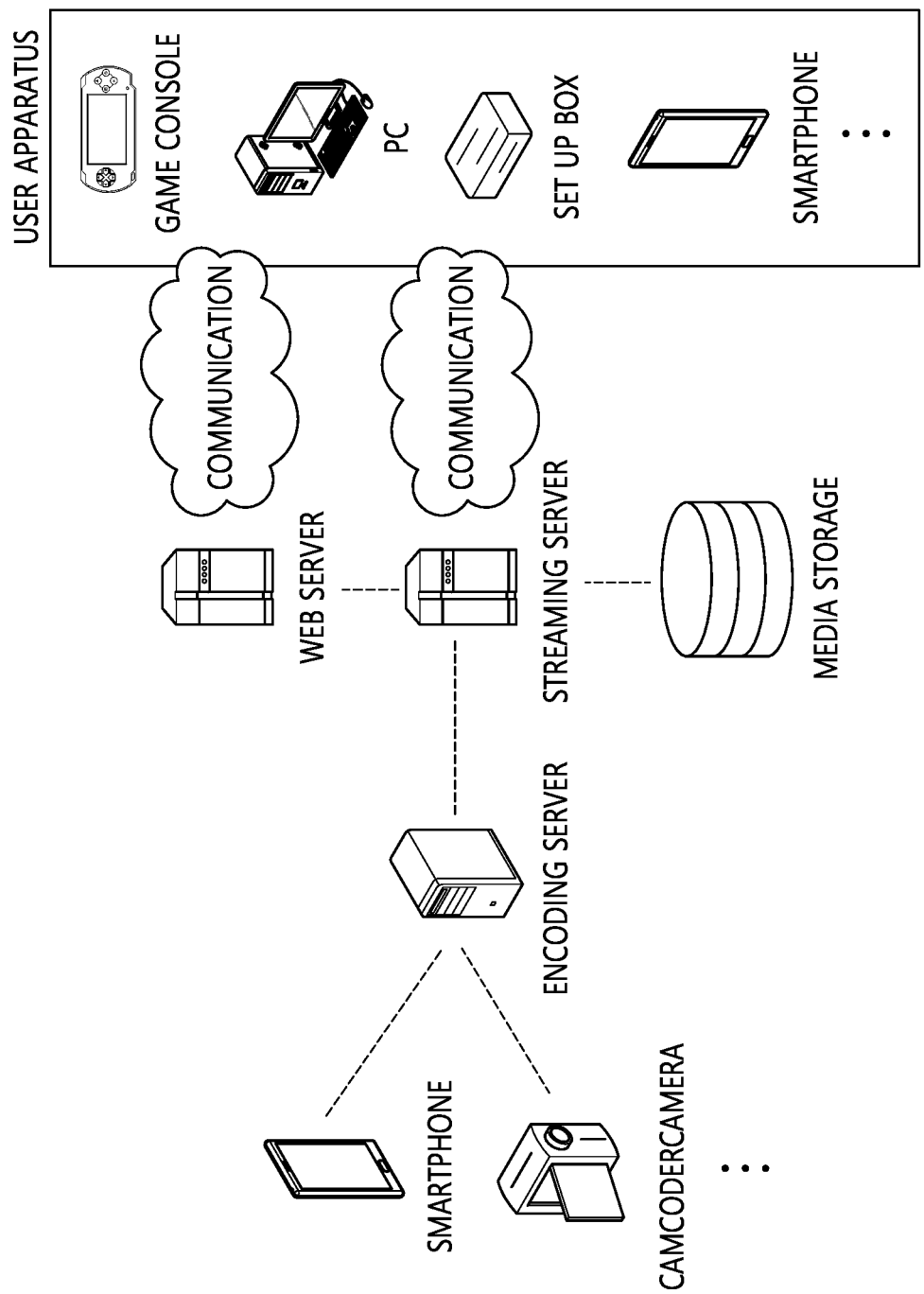
FIG. 16 shows an example of a content streaming system to which embodiments disclosed in the present document may be applied.

FIG. 16 shows an example of a content streaming system to which embodiments disclosed in the present document may be applied.

Referring to FIG. 16, the content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

Each server in the content streaming system may be operated as a distributed server, and in this case, data received from each server may be distributed and processed.

The claims described herein may be combined in various ways. For example, the technical features of the method claims of the present document may be combined and implemented as an apparatus, and the technical features of the apparatus claims of the present document may be combined and implemented as a method. In addition, the technical features of the method claim of the present document and the technical features of the apparatus claim may be combined to be implemented as an apparatus, and the technical features of the method claim of the present document and the technical features of the apparatus claim may be combined and implemented as a method.

What is claimed is:

1. An image decoding method performed by a decoding apparatus, the method comprising:
    obtaining image information including luma mapping with chroma scaling (LMCS) related information from a bitstream;
    deriving at least one LMCS codeword for an LMCS process based on the LMCS related information;
    generating reconstructed luma samples based on the at least one LMCS codeword; and
    generating modified reconstructed luma samples based on the reconstructed luma samples and the at least one LMCS codeword,
    wherein the LMCS related information includes information on linear mapping,
    wherein the at least one LMCS codeword is derived based on signaling of the information on the linear mapping, and
    wherein the at least one LMCS codeword is a multiple of two.

2. The method of claim 1, wherein an LMCS delta codeword is derived based on the information on the linear mapping,
    wherein the at least one LMCS codeword is derived based on a sum of the LMCS delta codeword and OrgCW,
    wherein OrgCW is equal to (1<<BitDepthY)/16, and
    wherein BitDepthY represents a luma bit depth.

3. The method of claim 1, wherein an LMCS delta codeword is derived based on the information on the linear mapping,
    wherein the at least one LMCS codeword is derived based on a sum of the LMCS delta codeword and OrgCW* (lmcs_max_bin_idx-lmcs_min_bin_idx+1),
    wherein lmcs_max_bin_idx and lmcs_min_bin_idx are a maximum bin index and a minimum bin index, respectively,
    wherein OrgCW is (1<<BitDepthY)/16, and
    wherein BitDepthY represents a luma bit depth.

4. The method of claim 1, wherein information on two pivot points is derived based on the information on the linear mapping,
    wherein the two pivot points include a first pivot point and a second pivot point,
    wherein an x value and a y value of the first pivot point are a minimum input value and a minimum mapping value, respectively,
    wherein an x value and a y value of the second pivot point are a maximum input value and a maximum mapping value, respectively,
    wherein input values between the minimum input value and the maximum input value are linearly mapped.

5. The method of claim 4, wherein an x delta value of the first pivot point and a y delta value of the second pivot point are signaled based on the information on the linear mapping,
    wherein the maximum input value is derived based on the x delta value of the second pivot point, and
    wherein the maximum mapping value is derived based on the y delta value of the second pivot point.

6. The method of claim 5, wherein the maximum mapping value is derived based on a following equation, $$\text{lmcsCWAll} = \text{lmcs\_}p2\_y = (1 << \text{bitdepth}Y) - 1 - \text{lmcs\_}p2\_y\_\text{delta} \quad [\text{Equation 16}]$$

wherein, lmcsCWALL and lmcs_p2_y represent the maximum mapping value, bitdepthY represents a luma bit depth, and lmcs_p2_y delta represents the y delta value of the second pivot point.

7. The method of claim 1, wherein the method further comprises deriving reconstructed chroma samples based on the LMCS related information, and
    wherein the reconstructed chroma samples are derived based on a single chroma residual scaling factor.

8. The method of claim 7, wherein the single chroma residual scaling factor is derived based on an average of inverse mapping gradients for deriving the modified reconstructed luma samples.

9. The method of claim 7, wherein based on signaling of the information on the linear mapping, a gradient reciprocal of the linear mapping is used as the single chroma residual scaling factor.

10. The method of claim 7, wherein parameters for the single chroma residual scaling factor are signaled based on the LMCS related information, and
    wherein the single chroma residual scaling factor is derived based on parameters for the single chroma residual scaling factor.

11. The method of claim 1, when a luma bit depth of the reconstructed luma samples is higher than 10, the at least one LMCS codeword is a multiple of 1<<(BitDepthY-10), and
    wherein, BitDepthY represents the luma bit depth.

12. The method of claim 1, wherein the at least one LMCS codeword is in a range from (OrgCW>>1) to (OrgCW<<1)-1.

13. An image encoding method performed by an encoding apparatus, the method comprising:
    deriving at least one luma mapping with chroma scaling (LMCS) codeword;
    generating residual information based on prediction for a current block;
    generating reconstructed luma samples based on the at least one LMCS codeword and the residual information;

generating modified reconstructed luma samples based on the at least one LMCS codeword and the reconstructed luma samples;

generating LMCS related information based on the at least one LMCS codeword, the reconstructed luma samples, and the modified reconstructed luma samples; and encoding image information including the residual information and the LMCS related information, wherein the LMCS related information includes information on linear mapping, wherein the at least one LMCS codeword is derived based on the information on the linear mapping, and wherein the at least one LMCS codeword is a multiple of two.

14. A decoding apparatus for image decoding, the decoding apparatus comprising:

a memory; and at least one processor connected to the memory, the at least one processor configured to:

obtain image information including luma mapping with chroma scaling (LMCS) related information from a bitstream;

derive at least one LMCS codeword for an LMCS process based on the LMCS related information;

generate reconstructed luma samples based on the at least one LMCS codeword; and generate modified reconstructed luma samples based on the reconstructed luma samples and the at least one LMCS codeword, wherein the LMCS related information includes information on linear mapping, wherein the at least one LMCS codeword is derived based on signaling of the information on the linear mapping, and wherein the at least one LMCS codeword is a multiple of two.

* * * * *